United States Patent [19]
Bailey et al.

[11] Patent Number: 6,139,946
[45] Date of Patent: *Oct. 31, 2000

[54] MAGNETIC RECORDING MEDIA INCORPORATING A QUATERNARY AMMONIUM FUNCTIONAL BINDER AND MAGNETIC PIGMENT SURFACE TREATED WITH COMPOUND HAVING ACIDIC AND ELECTRON WITHDRAWING FUNCTIONALITIES

[75] Inventors: Joseph K. Bailey, Eagan; John S. Roden, White Bear Lake, both of Minn.

[73] Assignee: Imation Corp., Oakdale, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/866,799

[22] Filed: May 30, 1997

[51] Int. Cl.$^7$ .................................................. G11B 05/706
[52] U.S. Cl. .......................... 428/323; 428/328; 428/403; 428/425.9; 428/500; 428/694 B; 428/694 BG; 428/694 BA; 428/900
[58] Field of Search ..................... 428/323, 328, 428/403, 425.9, 900, 500, 694 B, 694 BG, 694 BA

[56] References Cited

U.S. PATENT DOCUMENTS

| | | | |
|---|---|---|---|
| 4,707,410 | 11/1987 | Hata et al. | 428/413 |
| 5,064,687 | 11/1991 | Matsufuji et al. | 427/132 |
| 5,081,213 | 1/1992 | Carlson | 528/73 |
| 5,176,955 | 1/1993 | Ejiri et al. | 428/336 |
| 5,244,739 | 9/1993 | Carlson et al. | 428/425.9 |
| 5,318,838 | 6/1994 | Matsufuji et al. | 428/328 |
| 5,487,951 | 1/1996 | Evans et al. | 428/523 |
| 5,491,029 | 2/1996 | Evans et al. | 428/423.1 |
| 5,498,685 | 3/1996 | Carlson et al. | 528/71 |
| 5,501,903 | 3/1996 | Erkkila et al. | 428/328 |
| 5,510,187 | 4/1996 | Kumar et al. | 428/425.9 |
| 5,514,465 | 5/1996 | Handa et al. | 428/328 |

FOREIGN PATENT DOCUMENTS

| | | |
|---|---|---|
| 0 472 145 A1 | 2/1992 | European Pat. Off. . |
| 4-6619 | 1/1992 | Japan . |
| 6-180838 | 6/1994 | Japan . |
| WO 97/12941 | 4/1997 | WIPO . |

*Primary Examiner*—Stevan A. Resan
*Attorney, Agent, or Firm*—Amelia A. Buharin

[57] ABSTRACT

Surface treatment agents incorporating both acidic functionality and electron withdrawing functionality are extremely effective for promoting compatibility of magnetic pigments with binder systems incorporating quaternary ammonium functionality. Such surface treatment agents are particularly effective in combination with binder systems incorporating quaternary ammonium functional, nonhalogenated vinyl copolymers such as are described in U.S. Pat. No. 5,510,187.

49 Claims, No Drawings

MAGNETIC RECORDING MEDIA INCORPORATING A QUATERNARY AMMONIUM FUNCTIONAL BINDER AND MAGNETIC PIGMENT SURFACE TREATED WITH COMPOUND HAVING ACIDIC AND ELECTRON WITHDRAWING FUNCTIONALITIES

FIELD OF THE INVENTION

This invention relates to magnetic recording media of the type wherein the magnetizable layer includes magnetic pigment dispersed in a polymeric binder. More particularly, the invention relates to magnetic recording media in which the polymeric binder has quaternary ammonium functionality and the magnetic pigment is surface treated with a compound having acidic and electron withdrawing functionalities.

BACKGROUND OF THE INVENTION

Magnetic recording media generally comprise at least one magnetizable layer (also commonly referred to as an "information storing layer" or "magnetic recording layer") coated onto at least one side of a substrate. For particulate magnetic recording media, the magnetizable layer comprises a magnetic pigment dispersed in a polymeric binder. The polymeric binder of a magnetic recording medium is most commonly prepared from a polymer blend comprising a hard component, i.e., a polymer with relatively high glass transition temperature and modulus, and a soft component, i.e. a polymer with relatively low glass transition temperature and modulus. In addition to the binder and magnetic pigment, the magnetic layer may also include other components such as lubricants, abrasives, thermal stabilizers, catalysts, crosslinkers, antioxidants, dispersants, wetting agents, fungicides, bactericides, surfactants, antistatic agents, nonmagnetic pigments, coating aids, and the like.

Some forms of magnetic recording media, such as magnetic recording tape, may also have a backside coating applied to the other side of the substrate in order to improve the durability, conductivity, and tracking characteristics of the media. The backside coating also includes a polymeric binder and other components such as lubricants, abrasives, thermal stabilizers, catalysts, crosslinkers, antioxidants, dispersants, wetting agents, fungicides, bactericides, surfactants, antistatic agents, nonmagnetic pigments, coating aids, and the like.

The polymeric binders of the magnetic layer and the backside coating are commonly derived from polymers which require curing in order to provide magnetic recording media with appropriate physical and electromagnetic properties. To prepare such media, the components of the magnetic layer or the backside coating, as appropriate, are combined with a suitable solvent and thoroughly mixed to form a homogeneous dispersion. The resulting dispersion is then coated onto the nonmagnetizable substrate, after which the wet coating is passed through a magnetic field in order to orient, or randomize in some cases, the magnetic pigment. The oriented coating is then dried, calendered if desired, and then cured.

One problem associated with the manufacture of magnetic recording media relates to the strength of the magnetic field that can be used to orient the pigment in the wet magnetic layer after coating. Generally, it is desirable to use as strong of an orientation field as possible in order to enhance the electromagnetic properties of the resultant magnetic recording layer. Yet, if the magnetic field is too strong, the field can cause undesirable movement of the magnetic pigment. Such field induced movement can lead to orientation roughness and/or migration of the magnetic pigment in the dispersion. It would be desirable to find a technique that would allow higher orientation fields to be used while avoiding the problems of orientation roughness and pigment migration.

Another problem associated with manufacturing magnetic recording media relates to the tendency of magnetic pigments to agglomerate. Because of such tendency, magnetic pigments can be difficult to initially disperse in the polymeric binder and/or can be difficult to keep dispersed in the polymeric binder over time. Preferably, therefore, the magnetizable layer incorporates ingredients having characteristics which promote good wetting and dispersion of the magnetic pigment and reduces the tendency of the pigments to agglomerate.

Traditionally, good pigment wetting has been achieved by selecting suitable low molecular weight dispersing agents which interact strongly with the pigment surface and provide stability to the magnetic particles once dispersed. For higher pigment loadings, i.e., the use of greater amounts by weight of magnetic pigment, greater amounts of wetting agent or dispersant may be required. This is not always desirable. Dispersants tend to plasticize binder systems and decrease their modulus. Further, excess dispersant may exude from a cured binder system over time, leading to changes in the properties of the media as well as to contamination of a recording head or the like.

To help alleviate the problems associated with added low molecular weight dispersants or wetting agents, polymeric binders formed from "self-wetting" polymers have been developed. "Self-wetting" polymers have dispersing groups pendant from the polymer backbone that help disperse the magnetic pigment. Representative examples of dispersing groups include quaternary ammonium, amine, heterocyclic moieties, salts or acids based on sulfate, salts or acids based on sulfonate, salts or acids based on phosphate, salts or acids based on phosphonate, salts or acids based on carboxyl, mixtures thereof, and the like. As a result of using self-wetting polymers, less low molecular weight dispersant or wetting agent, or even no low molecular weight dispersant or wetting agent, may be needed to disperse the magnetic and nonmagnetic (if any) pigments in the polymeric binder.

For example, U.S. Pat. No. 5,510,187 describes one example of a so-called "self-wetting" polymeric binder system incorporating, in preferred embodiments, a quaternary functional, nonhalogenated vinyl copolymer in combination with a self-wetting polyurethane polymer. This kind of binder system has proved very effective in achieving good dispersions of magnetic particles, allowing magnetic recording media with excellent mechanical and electromagnetic properties to be prepared. Although the outstanding performance of this binder system is most likely due to many factors, it is believed that the quaternary ammonium functionality of the vinyl copolymer is a very important contributor to the success of this binder system.

Notwithstanding the excellent performance of this kind of binder system, advances in magnetic pigment technology demand even further wetting and modification of the pigment surface in order to achieve more uniform dispersion of the magnetic pigment. Previously, techniques for treating the surfaces of magnetic pigments with surface treatment agents in a manner that eases dispersion and reduces agglomeration have been proposed. For example, according to this approach, surfaces of a magnetic pigment may be modified so that the surface treated pigment becomes more compatible with the binder.

Indeed, a wide variety of surface treatment agents and methods are known. However, due to the performance capabilities of the kind of binder system described in U.S. Pat. No. 5,510,187, it would be extremely desirable to have a surface treatment approach for magnetic pigments that is particularly suitable for use in combination with binder polymers having quaternary ammonium functionality, particularly quaternary ammonium functional, nonhalogenated vinyl copolymers.

SUMMARY OF THE INVENTION

It has now been discovered that surface treatment agents incorporating both acidic functionality and electron withdrawing functionality are extremely effective for promoting compatibility of magnetic pigments with binder systems incorporating quaternary ammonium functionality. Such surface treatment agents are particularly effective in combination with binder systems incorporating quaternary ammonium functional, nonhalogenated vinyl copolymers such as are described in U.S. Pat. No. 5,510,187.

In practice, the present invention allows magnetic recording layers to be made with extremely smooth surfaces, even when the magnetic recording layer incorporates extremely small magnetic pigment particles (i.e., particles having a specific surface area of greater than 40 $m^2/g$). Although the present invention can be used to surface treat any kind of magnetic particles, the invention is particularly effective for promoting the compatibility of metal powder magnetic pigments with quaternary ammonium functional binders.

The present invention also allows wet magnetic layers to be oriented in stronger magnetic fields without causing orientation roughness or dispersion migration. This is extremely desirable, because the use of stronger orientation fields would provide magnetic recording media with better electromagnetic performance.

In one aspect, the advantages of the present invention are provided by a magnetic recording medium comprising a substrate and an information storing layer provided on the substrate, said information storing layer comprising:

(a) a polymeric binder comprising at least one binder resin having quaternary ammonium functionality;

(b) a plurality of magnetic pigment particles dispersed in the polymeric binder; and (c) at least a first surface treatment agent adsorbed onto the surface of at least a portion of the magnetic pigment particles, wherein the surface treatment agent comprises at least one pendant acidic group and at least one pendant electron withdrawing group.

In another aspect, the advantages of the present invention are provided by a surface treated magnetic pigment, comprising:

(a) a first surface treatment agent adsorbed onto the surface of the magnetic pigment, said first surface treatment agent comprising at least one pendant acidic group and at least one pendant electron withdrawing group; and (b) a second surface treatment agent adsorbed onto the surface of the magnetic pigment, said second surface treatment agent comprising at least one pendant acidic group.

DETAILED DESCRIPTION OF THE PRESENTLY PREFERRED EMBODIMENTS

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

Magnetic recording media of the present invention comprise at least one information storing layer provided on one or both surfaces of a substrate. In constructions such as magnetic tape or diskettes in which the substrate is substantially planar and has first and second opposed major surfaces, one or both surfaces of the substrate may be coated with an information storing layer. If only one side of the substrate bears an information storing layer, and if the embodiment is a tape, then the other side is preferably coated with a so-called backside coating that typically comprises a dispersion of nonmagnetic pigment(s) in a polymeric binder. Such backside coatings are typically used in order to impart desirable friction, antistatic, smoothness, and other properties to the magnetic recording medium in accordance with well known practices.

In an alternative so-called "Multiple Layer" construction, two or more layers may be coated onto the same side of the substrate, wherein at least one of the layers is an information storing layer comprising surface treated magnetic pigment of the present invention. If more than one of such layers comprises magnetic pigment, then the magnetic pigment in all the layers need not be the same. For example, the magnetic pigment used in one layer may have a different coercivity than the magnetic pigment used in another layer. Likewise, the magnetic pigment of one layer may be surface treated in accordance with the present invention, whereas the magnetic pigment of another layer may bear another surface treatment or may not be surface treated at all. If only one of such layers includes a magnetic pigment, then the other layer(s) may comprise a dispersion of nonmagnetic pigment particles in a polymeric binder.

The particular nonmagnetizable substrate of the present invention may be formed from any suitable substrate material known in the art. The substrate can be rigid or flexible, depending upon the intended end use of the magnetic recording medium. Examples of suitable substrate materials include, for example, polymers such as polyethylene terephthalate ("PET"), polyimide, and polyethylene naphthalene ("PEN"); metals such as aluminum, or copper; paper; or any other suitable material. Suitable substrates can have a variety of thicknesses, but most typically have a thickness in the range of from about 8 to 120 gauge for tape and from 1 to 4 mils for disks.

The components of the information storing layer comprise the magnetic pigment, the surface treatment agent, and the polymeric binder. The type of magnetic pigment used in the present invention may include any suitable magnetic pigment known in the art including $\gamma\text{-}Fe_2O_3$, cobalt-doped $\gamma\text{-}Fe_2O_3$, $Fe_3O_4$, $CrO_2$, barium ferrite, barium ferrite derivatives, ferromagnetic metal particles. The present invention is particularly advantageously used with ferromagnetic metal particle pigments. Generally, such pigments are very small, often being characterized by a specific surface area of 40 $m^2/g$ or higher. Such particles typically include a metal content of at least 70 weight percent, preferably at least 75 weight percent of metal in the form of ferromagnetic metals or metal alloys such as Fe, Fe—Co, Co, Ni, Co—Ni, Fe—Mn—Zn, Fe—Co—Ni—Cr, Fe—Co—Ni—P, Fe—Co—B, Fe—Co—Cr—B, Fe—Co—V, Co-phosphorous, and the like. A wide variety of ferromagnetic metal particle pigments are available commercially. Specific examples include D3-19, D3-41, HM-77, HM-101, and HM-94 pigments from Dowa Mining Co., Ltd., Tokyo, Japan; B-III, BR-1, DR-1, and F-1 pigments from Toda Kogyo Corp., Hiroshima, Japan; and MAPEX E3-1300HB, E3-1650HB, EI-2, and EI-3 pigments from Kanto Denka Kogyo Co., Ltd., Tokyo, Japan.

The pigments which are most beneficially treated with compounds of this invention have a basic surface. Without wishing to be bound by theory, it is reasonable to assume that the acidic sites on the surface modification agent bind to the basic sites on the pigment surface. For example, the surfaces of the metal particle magnetic particles are generally coated with anti-sintering agents during their manufacture. Common anti-sintering agents applied to pigment surfaces are oxides or hydroxides of aluminum, silicon, boron, calcium, magnesium, yttrium, neodynium, lanthanum, samarium, cerium, praseodynium, gadolinium, mixtures of these and the like. The anti-sintering agents are applied to the pigment to provide the final ferromagnetic metal powder with good oxidation resistance and also to preserve the shape of the particles during their manufacture. These anti-sintering agents and combinations thereof are typically applied at levels which result in the final ferromagnetic metal powder having a basic surface, i.e. these anti-sintering agents provide basic sites on the surfaces of the particles for binding the surface modification agent of the present invention and for binding the self-wetting polymer. If the pigment surface is very basic, it is difficult to disperse the particles without neutralizing the surface. One aspect of the present invention is that the acidic surface modifiers react strongly with basic sites on the pigment to neutralize the pigment surface and provide for more effective dispersion.

The high magnetic moment of ferromagnetic metal particle pigments combined with their high coercivity and small size makes them especially difficult to disperse. Even if one disperses them effectively, they can agglomerate during orientation, causing dispersion migration and orientation roughness. The present invention is particularly useful in stabilizing dispersions of ferromagnetic metal particles with magnetic moments of over 100 emu/g and having coercivities of over 1500 Oe.

The polymeric binder of the present invention comprises at least one polymeric binder resin having quaternary ammonium functionality. The information storing layer desirably includes a sufficient amount of binder to effectively disperse and bind the magnetic pigment in a pigment density sufficient to achieve desired performance properties. If too little binder is used, the durability and electromagnetic properties of the information storing layer may be poor. On the other hand, if too much binder is used, the density of the magnetic pigment may be too low and the capacity of the resultant media to store information may be reduced. Typically, the information storing layer may contain 100 parts by weight of the magnetic pigment and 5 to 40 parts by weight, more preferably, 10 to 30 parts by weight, of the polymeric binder.

In the practice of the present invention, the term "quaternary ammonium functionality" refers to moieties of the formula

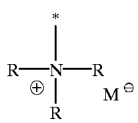

In the formula above, the bond denoted with the asterisk is attached to the backbone of the polymeric binder resin either directly or indirectly through a divalent linking group; each R may independently be any suitable monovalent moiety or co-member of a ring structure, and is preferably H or an alkyl group of 1 to 10 carbon atoms such as —$CH_3$; and M is any suitable counter anion such as $Cl^-$, $BR^-$, or the like. The term "quaternary ammonium functionality" also would encompass sulfobetaines, (e.g., —$N^+(CH_3)_2(CH_2CH_2CH_2SO_3^-)$).

In one preferred embodiment of the invention, the quaternary ammonium functional polymer is a nonhalogenated vinyl copolymer which is incorporated into the polymeric binder as the so-called "hard resin" component having a relatively high glass transition temperature ($T_g$). As used throughout this specification, the term "nonhalogenated" means that the copolymer contains no covalently bound halogen atoms. Thus, the term "nonhalogenated" excludes vinyl halide monomers such as vinyl chloride or vinylidene chloride as monomeric components of the copolymer, but the term "nonhalogenated" does not exclude monomeric components such as (meth)acryloyloxyethyl trimethylammonium chloride in which chlorine is present as a chloride anion. Throughout this specification, the prefix "(meth)acryl-" means "methacryl-" or "acryl-".

The term "vinyl" with respect to a polymeric material means that the material comprises repeating units derived from vinyl monomers. As used with respect to a vinyl monomer, the term "vinyl" means that the monomer contains a moiety having a free-radically polymerizable carbon—carbon double bond. Monomers having such moieties are capable of copolymerization with each other via the carbon—carbon double bonds.

In a particularly preferred embodiment of the invention, the nonhalogenated, vinyl copolymer is of the type comprising a plurality of pendant quaternary ammonium groups, a plurality of pendant crosslinkable moieties such as OH groups or moieties having carbon—carbon double bonds, and a plurality of pendant nitrile groups. Without wishing to be bound by theory, we believe that the nitrile groups may promote the compatibility of these vinyl copolymers with polyurethanes. The pendant hydroxyl groups of the vinyl copolymer not only facilitate dispersion of the magnetic pigment in the polymeric binder, but also promote solubility, cure, and compatibility with other polymers. The quaternary ammonium groups of the vinyl copolymer facilitate dispersion of the magnetic pigment in the polymeric binder.

As an option, the vinyl copolymer may also further include one or more additional kinds of dispersing groups other than the quaternary ammonium groups. It is desirable that the vinyl copolymer has an equivalent weight of quaternary ammonium and other dispersing groups, if any, in the range from about 2000 to about 100,000, preferably about 5000 to about 50,000. As used throughout this specification, the term "dispersing group" means that a group is capable of wetting the magnetic pigment. Preferably, the term "dispersing group" means a group that is ionized or ionizable at a pH in the range from 2 to 10. Representative examples of suitable dispersing groups include amines (e.g., —$N(CH_3)_2$ as one example), heterocyclic moieties as described in U.S. Pat. No. 5,081,213, salts or acids based on sulfate (e.g., —$OSO_3Na$ as one example), salts or acids based on sulfonate (e.g., —$SO_3Na$ as one example), salts or acids based on phosphate (e.g., —$OPO(OH)_2$ as one example), salts or acids based on phosphonate (e.g., —$PO(OH)_2$ as one example), salts or acids based on carboxyl (e.g., —$COONa$ as one example), mixtures thereof, and the like.

In order to provide a vinyl copolymer having pendant nitrile groups, one or more nitrile functional, nonhalogenated vinyl monomers may be incorporated into the vinyl copolymer. Representative examples of such monomers include (meth)acrylonitrile, β-cyanoethyl-(meth)acrylate, 2-cyanoethoxyethyl (meth)acrylate, p-cyanostyrene, p-(cyanomethyl)styrene, and the like. Preferably, the nitrile functional, nonhalogenated vinyl monomer is (meth) acrylonitrile, and more preferably acrylonitrile.

The hydroxyl groups of the nonhalogenated vinyl copolymer may be primary, secondary, or tertiary, although primary and secondary hydroxyl groups are preferred. Generally, preferred vinyl copolymers of the present invention have a hydroxyl equivalent weight in the range from about 300 to about 20,000, preferably 700 to 10,000, more preferably 700 to 6000. In order to provide a vinyl copolymer having a plurality of pendant hydroxyl groups, one or more nonhalogenated, hydroxyl functional, vinyl monomers may be incorporated into the vinyl copolymer. Representative examples of suitable nonhalogenated, hydroxyl functional, vinyl monomers include an ester of an a,b-unsaturated carboxylic acid with a diol, e.g., 2-hydroxyethyl (meth) acrylate, or 2-hydroxypropyl (meth)acrylate; 1,3-dihydroxypropyl-2-(meth)acrylate; 2,3-dihydroxypropyl-1-(meth)acrylate; an adduct of an a,β-unsaturated carboxylic acid with caprolactone; an alkanol vinyl ether such as 2-hydroxyethyl vinyl ether; 4-vinylbenzyl alcohol; allyl alcohol; p-methylol styrene; or the like. Preferably, the nonhalogenated, hydroxyl functional, vinyl monomer is selected from 2-hydroxyethyl (meth)acrylate, 2-hydroxypropyl (meth)acrylate, and mixtures thereof. Alternatively, vinyl copolymers with pendant hydroxyl groups can also be prepared by incorporating vinyl acetate into the vinyl copolymer and then partially or fully hydrolyzing the acetate moieties to produce hydroxyl groups.

The quaternary ammonium functionality and/or the optional one or more additional dispersing groups can be introduced into the vinyl copolymer in a variety of ways. As one approach, dispersing initiators may be used. Dispersing initiators initiate copolymerization of vinyl monomers to provide vinyl copolymers with terminal dispersing groups. Examples of suitable dispersing initiators include 4,4'-azobis (cyanovaleric acid), succinic acid peroxide, potassium persulfate, and sodium perphosphate. Another approach for introducing the dispersing group into the vinyl copolymer is to use a functional chain transfer agent such as mercaptosuccinic acid during copolymerization of the vinyl monomers.

The quaternary ammonium and/or optional one or more dispersing groups may also be introduced into the vinyl copolymer through the use of a nonhalogenated, vinyl monomer bearing a dispersing group. Representative examples of suitable nonhalogenated, vinyl monomers bearing a quaternary ammonium moiety include (meth) acryloyloxyethyl trimethyl ammonium chloride, (meth) acrylamidopropyl trimethylammonium chloride, vinylbenzyl trimethylammonium chloride, 2-hydroxy-3-allyloxypropyl trimethylammonium chloride, (meth) acryloyloxypropyl dimethylbenzylammonium chloride, dimethylaminoethyl (meth)acrylate, vinylbenzyl trimethylammonium chloride, N-(3-sulfopropyl)-N-(meth) acryloyloxyethyl-N,N-dimethylammonium betaine, 2-[(meth)acryloyloxy]ethyl trimethylammonium methosulfate, N-(3-sulfopropyl)-N-(meth) acrylamidopropyl-N,N-dimethylammonium betaine, combinations of these, and the like. Most preferably, such monomer is (meth)acryloyloxyethyl trimethylammonium chloride.

Representative examples of suitable nonhalogenated, vinyl monomers bearing other kinds of dispersing groups include (meth)acryloyloxyethyl acid phosphate, (meth) acrylamidopropyl sodium sulfonate, sodium styrene sulfonate, styrene sulfonic acid, (meth)acrylic acid, maleic acid, fumaric acid, maleic anhydride, vinyl sulfonic acid, 2-(meth)acrylamide-2-methyl-1-propanesulfonic acid, maleic anhydride, mixtures thereof, and the like.

A dispersing group may also be introduced into the vinyl copolymer using suitable polymer reactions. Examples of suitable polymer reactions to provide a dispersing group include: (1) reaction of succinic anhydride with a portion of the hydroxyl groups on a vinyl copolymer to produce a vinyl copolymer with pendant acid functionality; and (2) reaction of a tertiary amine with the epoxy groups on a vinyl copolymer to produce a vinyl copolymer with pendant quaternary ammonium groups. In order to provide a vinyl copolymer having a pendant epoxy groups for this reaction, nonhalogenated, epoxy functional vinyl monomers may be incorporated into the vinyl copolymer. Such monomers include, for example, glycidyl ether of an unsaturated alcohol such as allyl glycidyl ether, a glycidyl ester such as glycidyl (meth)acrylate, and the like.

Preferred vinyl copolymers of the present invention desirably also incorporate one or more other kinds of copolymerizable, nonhalogenated, vinyl monomers. Representative examples of suitable copolymerizable, nonhalogenated, vinyl monomers include styrene; alkylated styrenes; alkoxy styrenes; vinyl naphthalene; alkylated vinyl naphthalenes; alkoxy vinyl naphthalenes; (meth) acrylamides; N-vinyl pyrolidone; linear, branched, or alicyclic alkyl esters of (meth)acrylic acid wherein the alkyl groups contain from 1 to 20, preferably 1–8, carbon atoms, such as methyl (meth)acrylate, n-butyl (meth)acrylate, t-butyl (meth)acrylate, ethyl (meth)acrylate, isopropyl (meth)acrylate, and 2-ethylhexyl (meth)acrylate; vinyl esters of alkanoic acids wherein the alkyl moiety of the alkanoic acids contain 2 to 20, preferably 2 to 4, carbon atoms and may be linear, branched, or alicyclic; isobornyl (meth)acrylate; glycidyl (meth)acrylate vinyl acetate; allyl (meth)acrylate, and the like. Preferred nonhalogenated, nondispersing, vinyl monomers include styrene, alkyl-substituted styrenes, alkyl (meth)acrylates wherein the alkyl group contains 1 to 4 carbon atoms, and mixtures thereof. Most preferably, the copolymerizable, nonhalogenated, vinyl monomer is selected from styrene, an alkyl ester of (meth)acrylic acid wherein the alkyl group of the alkyl ester has 1 to 20 carbon atoms; and a blend comprising styrene and such an alkyl ester wherein the weight ratio of styrene to the alkyl ester is in the range from 10:90 to 90:10. For copolymers containing such an alkyl ester (meth)acrylate, the alkyl ester is preferably methyl (meth)acrylate, more preferably methyl methacrylate.

One particularly preferred nonhalogenated vinyl copolymer of the present invention is a nonhalogenated vinyl copolymer of monomers comprising 5 to 40, preferably 15 to 40, parts by weight of (meth)acrylonitrile; 30 to 80 parts by weight of one or more copolymerizable, nonhalogenated, vinyl monomers; 0.5 to 30 parts by weight of a nonhalogenated, hydroxyl functional, vinyl monomer; and 0.25 to 10, preferably 0.25 to 5, most preferably 0.5 to 2 parts by weight of a nonhalogenated, vinyl monomer bearing a quaternary ammonium group.

Nonhalogenated vinyl copolymers of the present invention may be prepared by free-radical polymerization methods known in the art, including but not limited to bulk, solution, emulsion and suspension polymerization methods. For example, according to the solution polymerization method, copolymers of the present invention are prepared by dissolving the desired monomers in an appropriate solvent, adding a chain-transfer agent, a free-radical polymerization initiator, and other additives known in the art, sealing the solution in an inert atmosphere such as nitrogen or argon, and then agitating the mixture at a temperature sufficient to activate the initiator.

Solvents useful in such polymerizations can vary according to solubility of the monomers and additives. Typical solvents include ketones such as acetone, methyl ethyl ketone, 3-pentanone, methyl isobutyl ketone, diisobutyl ketone, and cyclohexanone; alcohols such as methanol, ethanol, propanol, n-butanol, isopropanol, isobutanol, cyclohexanol and methyl cyclohexanol; esters such as ethyl acetate, butyl acetate, isobutyl acetate, isopropyl acetate, and the like; aromatic hydrocarbons such as benzene, toluene, xylenes, cresol, and the like; ethers such as diisopropyl ether, diisobutyl ether, tetrahydrofuran, tetrahydropyran, and dioxane; and aprotic solvents such as dimethylformamide, dimethylsulfoxide and the like, and mixtures thereof. The preferred solvent for preparation of the vinyl copolymers of the present invention is methyl ethyl ketone (MEK) because it is also one suitable medium in which the magnetic dispersions, described below, are prepared due to the ready solubility therein of polyurethane-vinyl copolymer blends.

Chain transfer agents suitable for solution polymerization include but are not limited to alcohols, mercaptans, certain halogenated small molecules, and mixtures thereof. Preferably, the chain transfer agent is chosen from the group consisting of carbon tetrabromide, isooctylthioglycolate, mercaptosuccinic acid, mercaptopropane diol, dodecyl mercaptan, ethanol and carbon tetrachloride. Most preferably, the chain transfer agent is mercaptopropane diol.

Free-radical polymerization initiators suitable for solution polymerization include those that are soluble in the reaction solvent and that are thermally activated, including but not limited to azo compounds, peroxides, and mixtures thereof. Useful peroxide initiators include those chosen from the group consisting of benzoyl peroxide, lauroyl peroxide, di-t-butyl peroxide and the like, and mixtures thereof. Useful azo compound initiators include those chosen from the group consisting of 2,2'-azobis(2-methylbutyronitrile); 2,2'azobis(isobutyronitrile); and 2,2'-azobis(2,4-dimethylpentanenitrile); each of which is commercially available as VAZO 67, VAZO 64, and VAZO 52, respectively, from E. I. Du Pont de Nemours and Co. The preferred thermal polymerization initiator is the VAZO 64 brand initiator because of its ease of use and its half-life characteristics (e.g., at 64° C., half-life is 10 hours).

Nonhalogenated vinyl copolymers of the present invention may also be prepared by emulsion polymerization methods. Typically, an emulsion comprising vinyl monomers, a chain-transfer agent and a water-soluble redox-type initiator system is prepared in an inert atmosphere, then heated carefully until a reaction exotherm occurs. The reaction mixture is stirred and cooled and the resulting latex is collected. Optionally, an ionic or nonionic surfactant may be added to the reaction mixture. Oxidation-reduction ("Redox") free-radical initiators useful in the invention include but are not limited to those chosen from the group consisting of tertiary amines with organic peroxides (exemplified by the N,N-diethylaniline-benzoyl peroxide pair); organic halides with transition metal complexes (exemplified by the carbon tetrachloride-molybdenum hexacarbonyl pair); inorganic oxidation-reduction systems (exemplified by the potassium persulfate-sodium metabisulfite pair); and organic-inorganic systems (exemplified by the 2-mercaptoethanol-$Fe^{+3}$ pair). Inorganic redox initiators are preferred for the copolymers of the invention because of their ease of handling and useful reaction temperature range.

In addition to the nonhalogenated vinyl copolymer, the polymeric binder of the present invention may also include one or more additional polymeric binder resins. Such additional resins may be any polymer, or combination of polymers, known in the art to be suitable as a binder material for magnetic recording media. Preferably, such additional polymeric binder resin is selected so as to serve as the so-called "soft resin" component of the polymeric binder having a relatively low $T_g$. Examples of polymers suitable for use as the one or more additional polymeric binder resins include thermoplastic or thermosetting polyurethanes, polyureas, nitrocellulose polymers, phenoxy resins, combinations of such polymers, and the like. For embodiments of the invention including such an additional resin and the nonhalogenated vinyl copolymer described above, the weight ratio of the nonhalogenated vinyl copolymer to the one or more additional resins is in the range from about 1:19 to 19:1, preferably 1:5 to 5:1, and more preferably 4:6 to 6:4.

In preferred embodiments of the invention incorporating a nonhalogenated vinyl copolymer as described above, the additional binder resin is desirably a polyurethane polymer. Representative examples of suitable polyurethane polymers include polyester polyurethanes, polyether polyurethanes, polyether polyester polyurethanes, polycarbonate polyurethanes, polyester polycarbonate polyurethanes, polycaprolactone polyurethanes, mixtures thereof, and the like.

As an option, the polyurethane polymer, or any other additional polymeric binder resin, may contain one or more pendant functional groups in order to enhance the performance of the magnetic recording medium. For example, the polyurethane polymer or other polymers may contain carbon—carbon double bonds and/or hydroxy groups to facilitate crosslinking if desired. As other examples of pendant functional groups, the polyurethane or other polymers may contain pendant dispersing groups, as are defined above, in order to facilitate dispersion of the magnetic pigment in the polymeric binder. In one preferred embodiment, the polyurethane polymer bears pendant hydroxyl groups and at least one pendant dispersing group. In another preferred embodiment, the polyurethane polymer bears pendant hydroxyl groups, at least one pendant dispersing group, and at least one pendant radiation curable moiety.

Preferred polyurethane polymers of the present invention are generally polymers of one or more polyisocyanates and one or more polyols, wherein the hydroxyl groups of the polyol(s) are in excess relative to the NCO moieties of the polyisocyanate(s). As used throughout this specification, the term "polyisocyanate" means one or more organic compounds that have two or more pendant NCO moieties on a single molecule. In the practice of the present invention, a polyisocyanate may be linear or branched aliphatic, alicyclic, aromatic, or the like. This definition of polyisocyanate includes diisocyanates, triisocyanates, tetraisocyanates, and mixtures thereof. Preferably, the polyisocyanate is one or more diisocyanates. Examples of suitable diisocyanates include diphenylmethane diisocyanate, isophorone diisocyanate, toluene diisocyanate, hexamethylene diisocyanate, tetramethylxylene diisocyanate, p-phenylene diisocyanate, mixtures thereof, and the like.

As used throughout this specification, the term "polyol" means one or more alcohols containing two or more hydroxyl groups per molecule, including diols, triols, tetrols, mixtures thereof, and the like. Various kinds of specific polyols can be incorporated into the polyurethane in order to improve the polyurethane's compatibility with the vinyl copolymer. For example, short chain diols, i.e., diols having a molecular weight up to about 300, may be used to increase the hardness and urethane content of the resulting polyurethane. It has also been found that increasing the urethane content of a polyurethane improves its compatibility with the vinyl copolymer. Representative examples of short chain diols include ethylene glycol, propylene glycol, 1,3-propane diol, 1,4-butane diol, 1,5-pentane diol, 1,6-hexane diol, neopentyl glycol, diethylene glycol, dipropylene glycol, 2,2,4-trimethyl-1,3-pentane diol, 1,4-cyclohexane dimethanol, ethylene oxide and/or propylene oxide adduct of bisphenol A, ethylene oxide and/or propylene oxide adduct of hydrogenated bisphenol A, mixtures, and the like.

As another example of using specific polyols to improve the compatibility of the polyurethane with the vinyl copolymer, diols or triols incorporating caprolactone may also be incorporated into the polyurethane. Such polycaprolactone polyols are unique because such materials have both polar and nonpolar characteristics. Representative examples of specific polycaprolactone diols and triols include TONE 0210™ polycaprolactone diol (OH equivalent weight of about 415) and TONE 0305™ polycaprolactone triol (OH equivalent weight of about 180) commercially available from Union Carbide Corp.

One example of a particularly preferred polyurethane (hereinafter referred to as the "Carboxyl-functional Polyurethane") for use in the practice of the present invention is a polyurethane comprising a pendant dispersing moiety of the formula —COOM, wherein M is H, Na, K, Li, NH$_4$, combinations of these, or the like. Preferably, M is H. One kind of preferred Carboxyl-functional Polyurethane is obtained from monomers comprising:

(i) one or more polyisocyanates;

(ii) one or more polyols having carboxylic acid and/or carboxylic acid salt functionality;

(iii) one or more other polyols; and (iv) optionally, one or more vinyl macromonomers having a number average weight greater than about 500 and having one or two isocyanate-reactive groups selected from hydroxyl, amino, mercapto, and the like.

Such a polyurethane may also have quaternary ammonium functionality, if desired. This kind of Carboxyl-functional Polyurethane has been described in co-pending application Ser. No. 08/576,616, filed Dec. 21, 1995.

Another kind of preferred Carboxyl-functional Polyurethane is a Half-ester Polyurethane comprising a pendant dispersing moiety of the formula

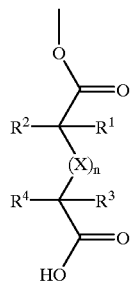

wherein $R^1$, $R^2$, $R^3$, and $R^4$ are independently selected from the group consisting of —H, —OH, —COOM, —SO$_3$M, —SH, —CH$_2$COOM, —SCH$_2$COOM, —P(=O)(OM)$_2$, —OP(=O)(OM)$_2$, and —Y, wherein at least one of $R^1$, $R^2$, $R^3$, and $R^4$ comprises a moiety other than —H or —Y;

Y is selected from the group consisting of linear alkyl groups comprising from about 1 to about 10 carbon atoms, branched alkyl groups comprising from about 1 to about 10 carbon atoms, and aryl groups comprising from about 6 to about 10 carbon atoms;

M is a cation selected from the group consisting of alkali metal cations, H$^+$ and ammonium cations;

$R^1$ and $R^2$ together or $R^3$ and $R^4$ together can be cis or trans =CHCOOH;

X is a divalent moiety independently selected from the group consisting of —CR$^5$R$^6$ and —NR$^7$;

n represents an integer selected from the group consisting of 0 and 1;

$R^5$ and $R^6$ are independently selected from the group consisting of —H, —OH, —COOM, —SO$_3$M, —SH, —CH$_2$COOM, —SCH$_2$COOM, —P(=O)(OM)$_2$, —OP(=O)(OM)$_2$, and —Y, wherein M and Y are as defined above;

$R^7$ is a monovalent moiety independently selected from the group consisting of —CH$_2$COOH, —CH$_2$CH$_2$COOH, —CH$_2$CH$_2$N(CH$_2$COOH)$_2$, —(CH$_2$)$_6$N(CH$_2$COOH)$_2$, —(CH$_2$CH$_2$O)$_2$CH$_2$CH$_2$N (CH$_2$COOH)$_2$, and —CH$_2$CH$_2$N(CH$_2$COOH) CH$_2$CH$_2$OH.

Preferably $R^1$, $R^2$, $R^3$, $R^4$, $R^5$, and $R^6$ are independently selected from the group consisting of —H, —OH, —COOM, —SO$_3$M, —SH, —CH$_2$COOM, —SCH$_2$COOM, and —Y, wherein M and Y are as defined.

Preferably, the Half-ester Polyurethane has a carboxyl equivalent weight in the range from 2000 to 30,000. In preferred embodiments, the Half-ester Polyurethane may also comprise a plurality of pendant hydroxyl and/or radiation curable moieties to facilitate curing of the polymer. If hydroxyl and/or radiation curable moieties are present, the Half-ester Polyurethane preferably has an equivalent weight based on such moieties in the range from 500 to 50,000, more preferably 1000 to 5000.

The Half-ester Polyurethane can be prepared according to a three-step reaction scheme. In the first step, excess polyisocyanate is reacted with polyol to form an NCO-capped precursor. The reaction occurs in a suitable solvent under anhydrous conditions in the presence of a suitable catalyst at a temperature in the range from 60° C. to 80° C. In a second step, a 1,4- or 1,5-dicarboxylic acid is added and heating continues. During this second step, the dicarboxylic acid rapidly reacts with some of the available NCO moieties to form the corresponding cyclic anhydride in situ. Preferably, the dicarboxylic acid is a 1,4- or 1,5-dicarboxylic acid containing at least one additional dispersing group other than the two acidic groups. Such dicarboxylic acids form cyclic anhydrides easily under dehydrating conditions, whereby the resulting cyclic anhydride is a five-membered ring or a six-membered ring, respectively, having a pendant dispersing group. More preferably, the dicarboxylic acid is selected from citric acid, mercaptosuccinic acid, dimercaptosuccinic acid, and mixtures thereof. The reaction occurring during the second step is exemplified by the following reaction scheme in which citric acid is the dicarboxylic acid and R-NCO represents a compound with an available NCO moiety:

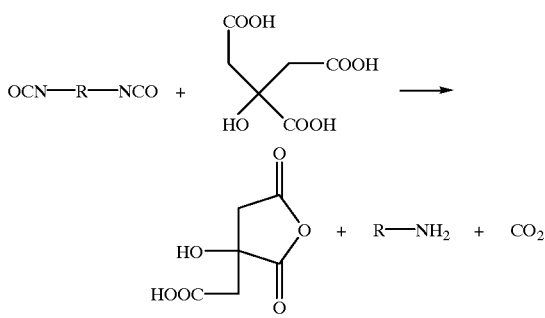

In a third step, heating continues as excess triol is added to the reaction mixture. The NCO precursor and the cyclic anhydride then react with available hydroxyl groups from the triol, and the resultant product is a polyurethane polymer with pendant hydroxyl groups, some or all of which may be esterified with the anhydride. The reaction of the anhydride with the pendant hydroxyl is exemplified by the following scheme in which citric acid anhydride is used:

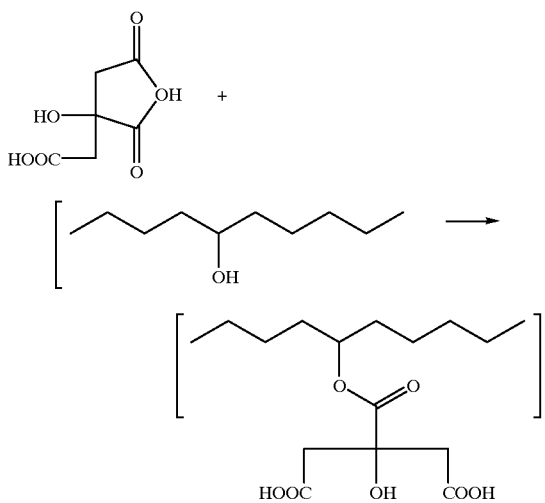

When NCO and anhydride can no longer be detected by infrared analysis, the reaction is deemed to be complete. The Half-ester Polyurethane is described in U.S. Pat. No. 5,498,685.

Another preferred polyurethane (hereinafter "Graft Polyurethane") is a polyurethane comprising a pendant nonhalogenated, copolymeric vinyl moiety, wherein the nonhalogenated, copolymeric vinyl moiety bears a plurality of nitrile groups. Preferably, the nonhalogenated, copolymeric vinyl moiety is a copolymeric moiety of monomers comprising (meth)acrylonitrile and optionally one or more of styrene or an alkyl ester of (meth)acrylic acid, wherein the alkyl group of the alkyl ester has 1 to 20, preferably 1 to 4, carbon atoms. In those embodiments of the present invention in which the nonhalogenated, copolymeric vinyl moiety comprises an alkyl ester of (meth)acrylic acid, the alkyl ester is preferably methyl (meth)acrylate. Graft polyurethanes and their preparation have been described in U.S. Pat. No. 5,244,739. The vinyl copolymeric moiety, or "macromonomer", of such polyurethanes greatly enhances the compatibility of such polyurethanes with the nonhalogenated vinyl copolymer, particularly when the polyurethane also incorporates polycaprolactone polyols.

Still other examples of preferred polyurethanes are the polyurethane polymers comprising pendant phosphonate functionality of the type described in either U.S. Pat. No. 5,501,903 or U.S. Pat. No. 5,491,029.

Information storing layers of the present invention advantageously incorporate at least a first surface treatment agent which is desirably adsorbed onto the surfaces of the magnetic pigment. The surface treatment agent is a compound comprising at least one acidic group and at least one electron withdrawing group. Advantageously, the use of a surface treatment agent with this kind of multiple functionality improves the dispersability of magnetic pigments in polymeric binders having quaternary ammonium functionality. As a result, the corresponding magnetic recording media are easier to manufacture and have better electromagnetic and mechanical performance properties than if the surface treatment agent lacked one or both of the acid or electron withdrawing functionalities.

While not wishing to be bound by theory, a possible rationale to explain such advantages can be suggested. Firstly, it is believed that the acidic group of the surface treatment agent is attracted to and binds with, or otherwise engages, a compatible site on the surface of a corresponding magnetic pigment particle. When a particle surface is treated with such agents, therefore, the agents form a spacing layer around the particle. In such a spacing layer, the acidic group of the surface treatment agents tend to be proximal to the surface of the treated particle, and the electron withdrawing group tends to be more towards the outer surface of the spacing layer. In practical effect, a surface treated particle has a "shell" with electron withdrawing groups with negative charge density positioned proximal to the outer surface of the shell. The negative charge density on the outer surface of the shell helps increase the steric stabilization of the pigment and polymer, strongly interacts with the positively charged quaternary ammonium groups of the polymeric binder to promote better dispersion, and helps prevent agglomeration of the pigment particles themselves.

The advantages of using the present surface treatment agent are heightened as the spacing between the electron withdrawing group and the acidic group of the surface treatment agent is increased. Accordingly, it is preferred that the acidic and electron withdrawing groups on a molecule are spaced apart as far as possible from each other. More preferably, it is particularly preferred that the surface treatment agent includes an electron withdrawing group and an acidic group pendant from substantially opposite ends of the surface treatment agent backbone.

During the process of manufacturing the information storing layer, the acidic groups of the surface treatment agent tend to compete with other acidic ingredients of the information storing layer for the basic binding sites on the magnetic pigment. The ability of the surface treatment agent to compete more effectively depends, in part, upon the degree of acidity of the surface treatment agent acidic group relative to other functional groups present on the other information storing layer ingredients. Generally, because stronger acidic groups compete more effectively for binding sites than weaker acidic groups, it is preferred if the acidic group of the surface treatment agent is at least as acidic, and preferably more acidic, than any other functional groups present in the other information storing layer ingredients, particularly the dispersing groups of the polymeric binder, to the extent that any are acidic.

The degree of acidity of a particular functional group corresponds to the pKa value associated with that group. As used herein, the term "pKa" refers to the negative logarithm of the acid dissociation constant, Ka. For an organic acid or alcohol of the formula ROH, Ka is defined as $$Ka = \frac{[H_3O^+][RO^-]}{[ROH]}$$

where the concentrations of the reactants are defined in units of molarity or moles/liter. pKa is described in, for example, *Introduction to Organic Chemistry*, Andrew Streitwieser, Jr. and Clayton H. Heathcock, McMillan Publishing Co., Inc. (New York, N.Y. 1976), pp. 214–216. Generally, a compound with a lower pKa value is more acidic than a compound with a higher pKa value.

Because of the synergy between the acidic and electron withdrawing groups of the surface treatment agent and the quaternary ammonium functionality of the binder, surface treatment agents of the present invention may have a wider range of pKa values and still be effective for surface treatment as compared to systems lacking one or more of such quaternary ammonium, acidic and/or electron withdrawing groups. For example, whereas the acidic groups of some of the previously known surface treatment agents of the prior art must have a pKa no greater than about 4.0 in order to be effective in combination with polymeric binders lacking quaternary ammonium functionality, acidic groups of this invention can be effective at pKa values up to about 4.5.

A wide variety of acidic groups may be used as the acidic group of the surface treatment agent of this invention with beneficial results. Representative examples of suitable acidic groups include an anhydric group, a —COOH group, sulfonic acid, a phosphonic acid group, salts of such groups, combinations of these, and the like. Of these, —COOH is presently most preferred in combination with metal particle magnetic pigments. In the practice of the present invention, a salt of an acidic group is also deemed to be an acidic group within the scope of the invention.

The electron withdrawing group is generally a moiety with a high electron affinity or high ionization potential. Electronegativity was originally defined by Pauling as "the power of an atom in a molecule to attract electrons to itself." [Linus Pauling, *The Nature of the Chemical Bond* 3rd Ed. Cornell University Press, Ithaca, N.Y. 1960, p.88.] The electronegativity or electron-withdrawing capacity of a group depends upon the electronic charge and hybridization of the atoms in the functional group, and hence depends on the composition of the molecule in which it is incorporated. Preferably, what is meant by the term electron-withdrawing group in this specification is a group which, if substituted for a Hydrogen atom (other than the acidic H) on a carboxylic acid would make the acid have a lower pKa, i.e. the functional group has a Hammett Substituent Constant greater than 0.1 as described in *Introduction to Organic Chemistry*, Andrew Streitwieser, Jr. and Clayton H. Heathcock, McMillan Publishing Co., Inc. (NY, N.Y. 1976) pp. 947–949. Representative examples of electron withdrawing groups include nitro, chloro, bromo, fluoro, iodo, oxo, perfluoroalkyl (such as trifluoromethyl), perfluoroalkoxy, hydroxy, cyano, combinations of these, and the like.

The information storing layer desirably incorporates a sufficient amount of the surface treatment agent effective to ease dispersion and help prevent agglomeration of the magnetic pigment during preparation of the magnetic recording medium of this invention. The optimum amount of surface treatment agent will depend upon a number of factors including the acid equivalent weight of the surface treatment agent, the specific surface area of the magnetic pigment being surface treated, the pH of magnetic pigment being treated, and the like. As one example, when using one of the metal powder magnetic pigments such as those commercially available under the trade designation Dowa HM-77 or Toda BR-I or the like, using 0.0005 to 0.05, more preferably 0.005 to 0.030 moles of acid functional groups per 100 grams of the pigment has been found to be suitable.

In one preferred embodiment, the surface treatment agent is a compound having the formula

E-X-A wherein E is the electron withdrawing group, A is the acidic group, and X comprises an aromatic moiety. Preferably, X is an aromatic ring, and E and A are substituents of the aromatic ring at meta or para positions relative to each other. More preferably, E and A are at a para position relative to each other. Due to greater spacing between the E and A groups, the surface treatment agent is much more effective when E and A are at a meta or para position relative to each other as compared to the performance of the agent if E and A were to be ortho to each other.

One representative class of compounds having the general formula E-X-A may be represented by the formula

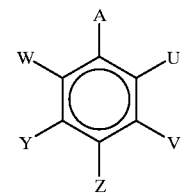

wherein of the ring substituents A, U, V, W, Y, and Z, A is the acidic group; at least one of Y, Z, and V is an electron withdrawing group E as defined above; and each of the other ring substituents not an A or E group is independently a monovalent group or, in combination with another substituent not an A or E group, a co-member of a ring structure fused to the ring shown in the formula. Representative examples of monovalent moieties suitable for use as a ring substituent include an additional A group, an additional E group; as well as hydrogen, alkyl, aryl, aralkyl, aryloxy, alkoxy, hydroxy alkyl, amino, ammonium, piperidino, morpholino, carboxy, carboxyamido, alkenyl, cycloalkyl, piperazino, carboxyalkyl, a sulphonic group, a sulfate group, a phosphonate group, a phosphate group, an acyl group, and combinations thereof. Any of such moieties, if cyclic, can include a plurality of rings if desired.

Another representative class of compounds having the general formula E-X-A may be represented by the formula

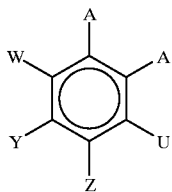

wherein of the ring substituents A, U, W, Y, and Z, each A is independently an acidic group as defined above; at least one of Y and Z is an electron withdrawing group E as defined above; and each of the other ring substituents not an A or E group is independently a monovalent group or, in combination with another substituent not an A or E group, a co-member of a ring structure fused to the ring shown in the formula, as defined above. In some embodiments of the invention, the two A groups of this formula are co-members of an acidic anhydric group such that the compound has the formula

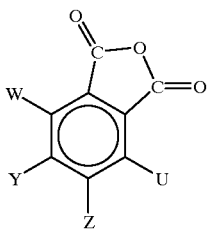

Another representative class of compounds having the general formula E-X-A may be represented by the formula

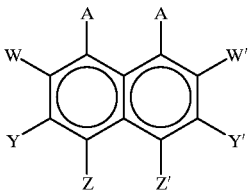

wherein of the ring substituents A, W, W', Y, Y', Z, and Z', each A is independently an acidic group as defined above; at least one of Y, Y', Z, and Z' is an electron withdrawing group E as defined above; and each of the other ring substituents not an A or E group is independently a monovalent group or, in combination with another substituent not an A or E group, a co-member of a ring structure fused to the ring shown in the formula, as defined above. In some embodiments of the invention, the two A groups of this formula are co-members of an acidic anhydric group such that the compound has the formula

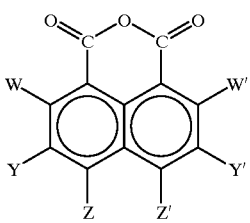

In the practice of the present invention, the moiety X may also comprise a heterocyclic aromatic moiety comprising an aromatic ring incorporating a heteroatom such as N, S or the like. Thus, compounds such as picilinic acid or nicotinic acid which include at least one E group as a substituent may also be used as the surface treatment agent of this invention.

In another embodiment of the invention, the surface treatment agent is a compound of the aromatic alternative formula

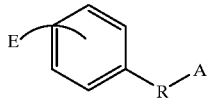

wherein E is an electron-withdrawing group as defined above and is preferably meta or para to the -R-A substituent; A is an acidic group as defined above; and R is a divalent linking group, preferably a divalent linking group of 1 to 4 carbon atoms such as —CH$_2$—, —CH$_2$CH$_2$—, —CH=CH—, —C≡C—, and the like. The other substituents of the aromatic ring not E or -R-A may be any monovalent ring substituent as defined above.

Representative examples of compounds having the general formula E-X-A or having the aromatic alternative formula include 4-bromophenylacetic acid; 4-nitro-3-hydroxy benzoic acid; 4-nitrobenzoic acid; 4-nitrophenylacetic acid; 4-chlorobenzoic acid; 3,4-dichlorobenzoic acid; 2,5-dinitrobenzoic acid; 3,4-dinitrobenzoic acid; 3,5-dinitrobenzoic acid; 4-nitrobenzylphosphonic acid; 3-hydroxy benzoic acid; 3-hydroxy phenylacetic acid; 4-chlorobenzoic acid; 3,4-dichlorobenzoic acid; 4-hydroxy-3-nitrophenyl acetic acid; 3,5-dihydroxy benzoic acid; 4-trifluoromethylbenzylphosphonic acid; 4-methlysulfonylbenzylphosphonic acid; 4-nitro picolinic acid; 4-nitro nicotinic acid; 5-hydroxy nicotinic acid; 4-nitro cinnamic acid; 5-nitro-2-furoic acid; 5-(4-nitrophenyl)-2-furoic acid; 5-nitro-3-pyrazole carboxylic acid; 3-nitrophthalic anhydride; salts of these acids; combinations of these; and the like.

In another preferred embodiment of the invention, the surface treatment agent is a compound of the formula

E-Y-A wherein E is the electron withdrawing group, A is the acidic group, and Y is a divalent moiety comprising a nonaromatic backbone. Preferably, E and A are each pendant from substantially opposite ends of said backbone. Representative examples of compounds according to this formula include bromoacetic acid; glycolic acid; nitromethane trispropionic acid; 3,8-dibromo octanoic acid; 5-nitro-2-oxo-valeric acid; salts of these acids; combinations of these, and the like.

Blends of different kinds of surface treatment agents may also be used in the practice of the present invention with beneficial results. For example, some embodiments of the present invention may include not only one or more first surface treatment agents of the type described above but also one or more second surface treatment agents as well. In preferred embodiments, the second surface treatment agent comprises at least one acidic group. The acidic group of the second surface treatment agent may be an acidic group or salt of an acidic group as defined above in connection with the first surface treatment agent.

The second surface treatment agent can be selected and/or provided with specific properties in order to improve the steric bulk of the spacing layer, to improve the coercivity of the resultant medium, and/or to contain specific functionality for imparting specific properties to the information storing layer, if desired. For example, in order to improve steric bulk, and/or to improve coercivity by increasing interparticle spacing, using a second surface treatment agent with relatively large steric hindrance may be desirable. Accordingly, for this purpose it may be preferred that the second surface treatment agent have a molecular weight at least as great as, preferably greater than, that of the first surface treatment agent.

One preferred example of a class of compounds providing steric hindrance has the formula

Z-A wherein Z is a monovalent group, preferably with a larger steric hindrance (i.e. larger molecular size) than the first surface treatment agent described above. In one preferred second surface treatment agent, Z contains two or more aromatic rings, which may or may not be fused to each other.

Representative examples of this second surface modifier structure include compounds such as biphenyl acetic acid; 4-phenyl benzyl phosphonic acid; benzhydrylphosphonic acid; benzhydrylsulfonic acid; 4'-octyloxy-4-biphenyl carboxylic acid; 4-octyloxy benzoic acid; triphenyl acetic acid; 4-benzoyl benzoic acid; 3-benzoyl benzoic acid; 9-fluorenone-4-carboxylic acid; naphthoxy acetic acid; naphthyl acetic acid; naphthoic acid; naphthalene sulfonic acid; 4,5-diphenyl phthalic acid; compounds such as

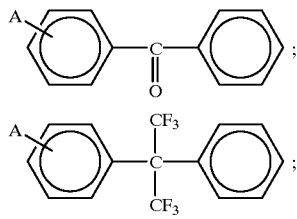

salts thereof; combinations thereof; and the like.

As another example of providing the second surface treatment agent with desired properties, the second surface treatment agent may include crosslinkable moieties, such as OH groups, $NH_2$ groups, SH groups, or groups having carbon—carbon double bonds, so that the second surface treatment agent would be crosslinkable with the polymeric binder. Examples of molecules that would be useful as a second surface treatment agent and be crosslinkable with the polymeric binder may be represented by the formula

F-X-A wherein A is the acidic group or salt thereof as defined above; F is a functional group capable of crosslinking with the binder such as OH, $NH_2$, SH, or a group containing a carbon—carbon double bond; and X is any suitable divalent linking group preferably such as is defined above. Preferably, F contains an aromatic ring, wherein F is either connected directly to the aromatic ring or is preferably connected to the aromatic ring by a linking group such as an alkylene or alkoxy (e.g., —$CH_2O$— or —$CH_2CH_2O$—) chain. Preferably, the F and A groups are bonded to the aromatic group in meta- or para-positions to each other.

Specific examples of compounds according to the formula F-X-A include

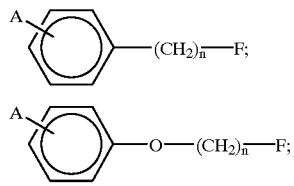

wherein n is typically 0 to 10, preferably 1 to 7; and the acidic group A is desirably meta or para to the substituent containing the F group. Other examples include compounds in which a crosslinkable double bond is part of a ring structure, such as

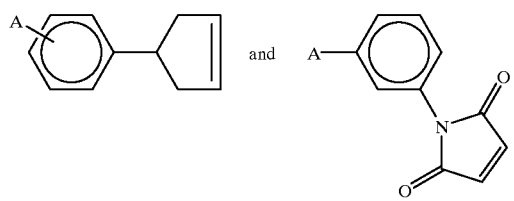

In addition to the polymeric binder resin(s), the surface treatment agent(s), and the magnetic pigment, the information storing layer of the present invention may also comprise one or more conventional additives. Such additives might include, for example, lubricants; abrasives; crosslinking agents; head cleaning agents; thermal stabilizers; antioxidants; dispersants; wetting agents; antistatic agents; fungicides; bactericides; surfactants; coating aids; nonmagnetic pigments; and the like in accordance with practices known in the art.

An information storing layer incorporating surface treated magnetic pigment of the present invention may be prepared using a variety of approaches. Generally, the magnetic pigment initially is combined with the surface treatment agent and a suitable solvent, and the resultant admixture is aggressively mixed in order to break up agglomerates of magnetic particles and allow the surface treatment agent to be adsorbed onto the surface of the particles. After that, the surface treated particles, the other components of the information storing layer, and a suitable solvent are combined and mixed to form a substantially homogeneous dispersion. In the event that the magnetic pigment is a metal powder, surface treatment, preparation of the homogenous dispersion generally occur under a blanket of $N_2$ or other inert atmosphere in order to prevent undue oxidation of the magnetic pigment.

The dispersion is then coated onto a substrate, which may be primed or unprimed and which may also optionally already bear another magnetizable or nonmagnetic layer in the event that the magnetic recording medium is to be a "multiple layer" magnetic recording medium. The dispersion may be applied to the substrate using any conventional coating technique, such as gravure or knife coating techniques. The coated substrate may then be passed through a magnetic field in order to orient or randomize the magnetic pigment, after which the coating is dried, calendered if desired, and then allowed to cure.

Curing can be accomplished in a variety of ways. As one approach, an isocyanate crosslinking agent can be added to the dispersion just before the dispersion is coated onto the substrate. As soon as the isocyanate crosslinking agent is added to the dispersion, the NCO groups of the isocyanate crosslinking agent will begin to react with the hydroxyl groups of the polymeric binder. Preferably, a catalyst, e.g., dibutyltin dilaurate, may also be added in suitable catalytic amounts in order to facilitate this crosslinking reaction. Generally, using from 0.02 to 0.2 parts by weight of catalyst per 100 parts by weight of magnetic pigment has been found to be suitable in the practice of the present invention.

The isocyanate crosslinking agent, if any, is a polyfunctional isocyanate having an average functionality of at least 2 isocyanate groups per molecule. Examples of specific polyfunctional isocyanate useful as the isocyanate crosslinking agent in the practice of the present invention include materials commercially available as MONDUR CB-601, CB-75, CB-701, MONDUR-MRS from Miles, Inc.; DES-MODUR L available Bayer A.G.; CORONATE L from Nippon Polyurethane Ind., Ltd.; and PAPI from Union Carbide Corp. A particularly preferred crosslinker is a "toughened polyisocyanate activator" (TPA). One useful TPA is obtained as the reaction product of an excess of a polyisocyanate with polyols, including 10–80% by weight of an oligomeric polyol which acts as a toughening segment. The oligomeric polyols useful in making toughened polyisocyanate curatives have a number average molecular weight of about 500 to about 5000 and a glass transition temperature of lower than about 0° C., preferably lower than about minus 20° C.

One particularly preferred toughened polyisocyanate activator is made from the reaction product of CB55N (MONDUR™ CB-55N from Bayer Corporation) with 45 weight percent of a polycaprolactone diol of 1300 number average molecular weight. This modification of CB-55N provides a faster cure and a tougher coating.

The isocyanate crosslinking agent is preferably used in an amount such that the molar ratio of NCO groups from the isocyanate crosslinking agent to the total number of hydroxy groups from the hydroxy functional polymer is greater than 0. Preferably, the molar ratio of the NCO groups from the isocyanate crosslinking agent to the total number of hydroxy groups from the hydroxy functional polymer, i.e., activation index, is in the range from 0.3 to 6, more preferably 0.5 to 4.

As another approach, when one or more components of the polymeric binder contain radiation curable moieties, the dried coating may be irradiated to achieve curing of the radiation curable materials. Irradiation may be achieved using any type of ionizing radiation, e.g., electron beam radiation or ultraviolet radiation, in accordance with practices known in the art. Preferably, radiation curing is achieved with an amount of electron beam radiation in the range from 1 to 20 Mrads, preferably 4 to 12 Mrads, and more preferably 5 to 9 Mrads of electron beam radiation having an energy in the range from 100 to 400 keV, preferably 200 to 250 keV. Although electron beam irradiation can occur under ambient conditions or in an inert atmosphere, it is preferred to use an inert atmosphere as a safety measure in order to keep ozone levels to a minimum and to increase the efficiency of curing. "Inert atmosphere" means an atmosphere comprising nitrogen or a noble gas and having an oxygen content of less than 500 parts per million ("ppm"). A preferred inert atmosphere is a nitrogen atmosphere having an oxygen content of less than 75 parts per million.

Traditionally, radiation curable formulations have most commonly relied upon the reactivity of acrylates, methacrylates, and the like to achieve radiation-induced crosslinking. Unfortunately, however, magnetic dispersions prepared from such materials tend to undergo unwanted crosslinking reactions under ambient conditions to form gels, particularly when the magnetic pigment is a metal particle pigment. These dispersions are especially prone to suffer from undesirable crosslinking during dispersion milling.

However, because radiation curable polymers having dispersing groups are capable of wetting/dispersing the magnetic pigment, it would be desirable to include at least some of such polymers in the milling step. In order to accomplish this, radiation curable (meth)acrylate groups may be replaced by allyloxy groups (—O—$CH_2$—CH=$CH_2$), or a-methyl styrene moieties of the formula

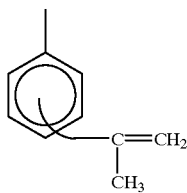

Allyloxy groups and a-methyl styrene moieties are more stable to the milling process than (meth)acrylate groups.

According to a particularly preferred approach for making a magnetic recording medium of the present invention incorporating a metal powder magnetic pigment, the metal powder magnetic pigment, the surface treatment agent(s), and solvent are combined in a kneader or other high energy mixer (such as a double planetary mixer) under a blanket of $N_2$. The ingredients are mixed for a sufficient time, typically 10 to 30 minutes, to achieve good surface treatment of the pigment.

Advantageously, the progress of the surface treatment can be followed by monitoring the torque and/or power draw of the kneader, or other mixer as the case may be, as a function of time. Initially, kneader torque (or power draw) tends to oscillate between minimum and maximum values. As mixing continues, and the surface treatment agent is adsorbed onto the surface of the pigment, the amplitude of the oscillations decreases and eventually the torque (or power draw) curve settles down to have a relatively flat profile. After the torque (or power draw) curve flattens like this, surface treatment is typically completed sufficiently for good dispersion of the surface particles to have been achieved.

The solvent for surface treatment is used in an amount such that the surfaces of the pigment are wetted out yet the admixture of solvent, magnetic pigment, and surface treatment agent preferably has a powder-like consistency. A variety of solvents could be used to accomplish surface treatment. Desirably, a solvent is selected which is compatible with the surface treatment agent and the other components, particularly the polymeric binder, to be incorporated into the information storing layer. Examples of suitable solvents include tetrahydrofuran (THF), methyl ethyl ketone (MEK), methyl isobutyl ketone (MIBK), cyclohexanone, toluene, combinations of these, and the like. Of these, THF is presently preferred.

After surface treatment is completed to the degree desired, a solution comprising solvent and at least a portion of the uncured polymeric binder resin(s) is added to the apparatus used for surface treatment. The portion of binder resins to be added is not particularly critical, and only a portion, or even all, of the binder resin(s) could be added at this point. However, adding only a portion of the binder resin(s) at this point may provide processing advantages. For example, in choosing how much of the resins to add, enough should be added to achieve good dispersion of all of the surface treated particles. However, adding more binder resin than is needed for good dispersion typically requires adding a large quantity of solvent, which lowers the viscosity of the dispersion. This, in turn, decreases the amount of energy available to disperse the particles.

Accordingly, adding approximately half of the binder resin(s) at this point in the form of a polymer resin solution containing about 20% to 50%, preferably 25% to 50%, solids in a solvent has been found to be suitable. A variety of solvents, or combinations of solvents, can be used in the polymer solution. Examples of suitable solvents would include tetrahydrofuran (THF), methyl ethyl ketone (MEK), methyl isobutyl ketone (MIBK), cyclohexanone, toluene, mixtures of these, and the like. Of these, a solvent blend of 40 parts by weight MEK, 30 parts by weight THF, and 30 parts by weight MIBK has been found to be suitable in the practice of the present invention.

While the polymer solution is being mixed with the surface treated pigment, torque, power draw, and/or temperature of the admixture can be monitored as a function of time. After some time, for example 2 seconds to 30 minutes depending upon the type of equipment being used, a spike in the monitored parameter should be observed. If no such spike is observed after about 15 to 30 minutes, additional solvent should be added until such a spike is observed. Typically, adding enough additional solvent to drop the solids content to about 65% to about 70% solids is typically sufficient to cause the spike to occur, The spike indicates that the polymer/solvent phase of the admixture has become a continuous phase and now has viscoelastic properties. After the spike occurs, the measured parameter tends to plateau. In some instances, particularly when temperature is the measured parameter, the plateau may have a slight positive slope. Mixing is desirably allowed to continue a defined amount of time, e.g., 5 minutes to 2 hours, after the spike occurs. Longer mixing times are generally used with larger scale equipment.

After mixing is completed, the resulting dispersion is transferred to a media mill where a 20% to 60%, preferably 25% to 50%, solids solution of the remaining binder resin(s), if any, in a solvent such as that defined above, is added to the mill. If necessary, additional solvent as defined above with respect to the polymer solution is added to bring the total solids content to about 35% to 50% by weight. The combined ingredients are then milled until substantially homogeneous. Typically, milling is continued until no further changes in the surface gloss of handspreads of samples being milled are observed and/or until no large agglomerates are observed when a dispersion sample is smeared onto a glass slide and viewed under an optical microscope at a magnification of about 100× to 500×. The type of milling media used is not critical and may be stainless steel, ceramic, or the like.

Once the dispersion is homogeneous, the other ingredients of the information storing layer can be milled or blended into the dispersion. If blending is used, the ingredients may be transferred to a suitable high shear mixer or shaker, or the like, in order to accomplish blending. The dispersion may then be coated onto the substrate. After coating, drying and orientation take place. These steps may occur either in a sequence of steps or in a single step. For example, in a sequence of steps, the wet, coated information storing layer can be passed first through a magnetic orientation field, e.g., a magnetic field of about 1500 to 1600 gauss and then dried. Alternatively, the wet, coated layer can be dried and oriented in a magnetic orientation field, e.g., a magnetic field of about 6000 gauss, at the same time. With either approach, drying may be accomplished under any suitable conditions, including drying under ambient conditions, drying in an oven, or an oven purged with inert gas, e.g., $N_2$, as desired. Optionally, the information storing layer can then be calendered after drying.

The present invention will now be further described with reference to the following examples.

EXAMPLE 1

Preparation of Nonhalogenated Vinyl Copolymer

This copolymer is constructed from Styrene (72.4%), acrylonitrile (24.1%), hydroxypropylacrylate (2.5%), and methacryloxyethyl trimethyl ammonium chloride (1.0%).

3.0 g of methacryloxyethyl trimethyl ammonium chloride (QMA) was predissolved in 7.5 g of bydroxypropyl acrylate (HPA) in a 100 ml wide mouth jar by rolling the containing the two components on a rubber roller.

In a one-liter amber reaction bottle were charged the above premix of QMA and HPA, 217 g styrene (St), 72.3 g acrylonitrile (AN), 0.6 g mercaptopropane diol (MPD), 1.8 g 2,2 azobisisobutyronitrile (AIBN) and 338 g methylethyl ketone (MEK). The resulting clear solution was purged with nitrogen for 5 minutes at 1 liter per minute. After that, the bottle was sealed and tumbled in a constant temperature bath at 65° C. for 48 hours. The product obtained was a clear homogeneous solution with inherent viscosity of 0.31 dl/g and 950 cps Brookfield viscosity.

EXAMPLE 2

Preparation of Phosphonate Functional Polyurethane (Polyurethane A)

Polyurethane A was a "soft", self-wetting, phosphonated polyurethane. It is constructed from the monomers polycarbonate (5.0%), neopentyl glycol (5.0%), MDI (47.0%), Fyrol-6 (6.5%) and Tone 0305 (12.0%).

The preparation of Polyurethane A is described in U.S. Ser. No. 5,501,903 as example 2C.

EXAMPLE 3

Preparation of "Half-ester" Polyurethane (Polyurethane B)

This polymer was constructed from 17 parts by weight Polycaprolactone diol (TONE™ 0230), 45 parts by weight dimethylolpropionic acid (DMPA) and 38 parts by weight Diphenylmethane diisocyante (MDI). The ingredients were combined and mixed together at 40% by weight solids in MEK with a trace amount of dibutyltin dilaureate catalyst. The reactants were heated to about 80° C. with stirring under anhydrous conditions until the reaction was complete.

EXAMPLE 3A

Toughened Polyisocyanate Activator (TPA)

To a 12 liter flask was added 2440 g (3.813 equivalents) TONE™ 0230 caprolactone diol from Union Carbide Corporation, 5053 g (11.44 equivalents) of CB55N from Bayer, 0.2 g of dibutyltin dilaureate catalyst and 2945 g MEK. The reaction was held at 75° C. for 2 hours until no hydroxyl groups were detectable by infrared spectroscopy. The material had a calculated isocyanate equivalent weight of 685, a calculated molecular weight of 2740 and a calculated functionality of 4.0. The percent solids were 50% in MEK.

EXAMPLE 4

Preparation of Magnetic Recording Media

Using different surface treatment agents, a number of magnetic recording media samples were prepared using the following formulation:

| | |
|---|---|
| Metal particle magnetic pigment (Toda BR-I) | 100 parts by weight |
| Vinyl copolymer of example 1 | * See below |
| Polyurethane of example 2 | ** See below |
| Surface treatment agent | 0.015 mol/100 g pigment |
| myristic acid (10.7% by weight solids in MEK) | 2 parts by weight of solids |
| butyl stearate | 1 part by weight |
| NCO crosslinker (55% by weight solids Mondur CB-55N in MEK) | 1.5 activation index |

* For each sample, the amount of vinyl copolymer to add was determined from the following formula:
weight = 0.4 [14.65 − weight surface − weight
polymer               treatment agent     crosslinker]
** For each sample, the amount of polyurethane to add was determined from the following formula:
weight = 0.6 [14.65 − weight surface − weight
polymer               treatment agent     crosslinker]

For each sample, an admixture of the surface treatment agent and the magnetic metal pigment in THF was made such that the total weight percent solids was 80%. The admixture was aggressively mixed in the $N_2$-blanketed kneading chamber of a Brabender Plasticorder kneader (C. W. Brabender Instruments, Inc., 50 East Wesley Street, South Hackensack, N.J. 07606 USA). After surface treatment was complete, a polymer solution containing one half of each polymer at 28% solids in a 40:30:30 blend of MEK/THF/MIBK was added. Kneading was then continued until a smooth paste was obtained. Torque of the kneader was monitored to make sure a torque spike was observed. For samples in which no torque spike was observed after 5 minutes, solvent was titrated into the chamber at a rate of about 1 ml/min until a spike was observed. Kneading continued for 5 minutes after the spike occurred.

After kneading was completed, the kneaded paste was further processed in a Quickee mill, where the other half of the polymers were added, again via a polymer solution of 28% solids in a 40:30:30 blend of MEK/THF/MIBK. An additional amount of the 40:30:30 blend of MEK/THF/MIBK was added to adjust the solids content to 50% by weight. The dispersion was milled by shaking. The lubricants, crosslinker, and sufficient 40:30:30 blend of MEK/THF/MIBK to provide a 30% solids content were then blended into the other ingredients in the Quickee mill with additional shaking. The final weight loading of magnetic pigment in the resultant dispersion relative to the other non-solvent ingredients was 85% by weight in all samples.

Handspreads of each dispersion sample were pulled at 30% final solids in order to coat the dispersion onto a substrate. Handspreads were pulled with different orientation fields. For some samples, one procedure was used in which the handspreads were pulled through a 1600 Oe permanent magnetic field. For other samples, handspreads were pulled first and then dried in a 6000 Oe electromagnetic field. A sample of each handspread was also calendered. The properties of the resultant uncalendered handspreads are shown in the following table, except that gloss is shown both before and after calendaring at 750 pli using a 1-nip calendar stack:

TABLE 1

Effects of Location of Electron Withdrawing Group
Toda BR-I pigment-0.015 moles Surface modifier per 100 g pigment

| Compound | Orientation Field (Oe) | Coercivity (Oe) | Squareness ($\phi r/\phi m$) | Gn (1/SFD) | 45° Gloss | Calendered 45° Gloss |
|---|---|---|---|---|---|---|
| None | 6000 | 1698 | 0.874 | 2.50 | N.A. | N.A. |
| α-Bromo-phenylacetic acid | 6000 | 1676 | 0.900 | 2.61 | N.A. | N.A. |
| 4-bromo-phenylacetic acid | 6000 | 1692 | 0.916 | 2.96 | 120 | 180 |
| None | 1600 | 1596 | 0.711 | 1.61 | 86 | 164 |
| α-bromo-acetic acid | 1600 | 1522 | 0.636 | 1.25 | 30 | 120 |
| 4-bromo-acetic acid | 1600 | 1621 | 0.753 | 1.95 | 92 | 145 |

The data in Table 1 shows that the alpha-bromophenylacetic acid, which has the bromo group adjacent to the carboxylic acidic group, does not perform well as a surface modifier. The gloss of the samples oriented in the 6000 Oe magnetic field could not be measured because the dispersion migration was too severe. On the other hand, the 4-bromophenylacetic acid, which has the bromo group at the opposite end of the molecule from the carboxylic acid wetting group, prevents dispersion migration and gives excellent squareness and Gn.

EXAMPLE 5

Preparation of Magnetic Recording Media

The procedure of Example 4 was followed, except additional surface treatment agents were tested. The results in this example show the importance of having a sufficiently low pKa for the acidic groups. In addition, 2-bromooctanoic acid was compared to 8-bromoocatnoic acid. The 2-bromooctanoic acid did not perform well because its electron withdrawing group is not located at the opposite end of the molecule from the carboxylic acidic group, whereas the 8-bromooctanoic acid did not perform well because it does not have a low enough pka. The results are shown in the following table:

TABLE 2

Effects of pKa and Location of Electron Withdrawing Group
Toda BR-I pigment-0.015 moles Surface modifier per 100 g pigment

| Compound | pKa | Orientation field (Oe) | Coercivity (Oe) | Squareness ($\phi r/\phi m$) | Gn (1/SFD) | 45° Gloss | Calendered 45° Gloss |
|---|---|---|---|---|---|---|---|
| None | — | 6000 | 1698 | 0.874 | 2.50 | N.A. | N.A. |
| 4-bromo-phenylacetic acid | 4.19 | 6000 | 1692 | 0.916 | 2.96 | 120 | 180 |
| 2-bromo-octanoic acid | ~2.9 | 6000 | 1670 | 0.891 | 2.53 | N.A. | N.A. |
| 8-bromo-octanoic acid | ~4.8 | 6000 | 1672 | 0.904 | 2.52 | N.A. | N.A. |
| None | — | 1600 | 1596 | 0.711 | 1.61 | 86 | 164 |
| 4-bromo-acetic acid | 4.19 | 1600 | 1621 | 0.753 | 1.95 | 92 | 145 |
| 2-bromo-octanoic acid | ~2.9 | 1600 | 1570 | 0.711 | 1.64 | 24 | 148 |
| 8-bromo-octanoic acid | ~4.8 | 1600 | 1573 | 0.705 | 1.64 | 63 | 159 |

From the data in Table 2, it is evident that the 2-bromooctanoic acid and the 8-bromooctanoic acid do not prevent dispersion migration and give relatively poor properties compared to 4-bromophenylacetic acid. Although 2-bromooctanoic acid has a low pKa and therefore a strong acid strength, it does not have an electron withdrawing group located at the opposite end of the molecule from the wetting group. Although 8-bromooctanoic acid has an electron withdrawing group at the opposite end of the molecule as the carboxylic acidic group, it does not have a low pka. The 4-bromophenylacetic acid meets both these criterion and therefore prevents migration and provides excellent magnetic performance.

EXAMPLE 6

Preparation of Magnetic Recording Media

The procedure of Example 4 was followed, except additional surface treatment agents were tested. Also, Dowa HM-77 metal powder magnetic pigment was substituted for the Toda BR-I metal powder magnetic pigment. Samples are shown below for 4-nitrobenzoic acid, 4-nitrophenylacetic acid, 4-chlorobenzoic acid, 3–4 dichlorobenzoic acid, 3,5-dinitrobenzoic acid, 4-nitrocinnamic acid. The performance of these are compared to the use of diphenylacetic acid, 4-octyloxybenzoic acid, and myristic acid as surface treatment agents. The results are shown in the following two tables:

TABLE 3

Examples of Effective Surface Modification
Dowa HM-77 pigment-0.015 moles Surface modifier per 100 g pigment

| Compound | pKa | Orientation field (Oe) | Coercivity (Oe) | Squareness ($\phi r/\phi m$) | Gn (1/SFD) | 45° Gloss | Calendered 45° Gloss |
|---|---|---|---|---|---|---|---|
| 4-nitrophenyl- | 3.85 | 6000 | 2135 | 0.866 | 2.63 | 127 | |
| | | | | | | | 185 |
| acetic acid | | | | | | | |
| 4-nitrobenzoic acid | 3.42 | 6000 | 2177 | 0.856 | 2.49 | 121 | 188 |
| 4-chlorobenzoic acid | 3.97 | 6000 | 2131 | 0.860 | 2.45 | 94 | 176 |
| 3,4 dichlorobenzoic acid | ~3.6 | 6000 | 2122 | 0.855 | 2.53 | 104 | 181 |
| 3,5 dinitrobenzoic acid | ~2.8 | 6000 | 2127 | 0.870 | 2.54 | 84 | 169 |
| 4-nitrocinnamic acid | ~4.2 | 6000 | 2162 | 0.845 | 2.29 | 133 | 181 |

In Table 3, all of the surface treatment agents have good magnetic performance, and all prevent dispersion migration during orientation. Compare these results with those shown in Table 4:

TABLE 4

Comparative Examples of Surface Modification
Dowa HM-77 pigment-0.015 moles Surface modifier per 100 g pigment

| Compound | pKa | Orientation field (Oe) | Coercivity (Oe) | Squareness ($\phi r/\phi m$) | Gn (1/SFD) | 45° Gloss | Calendered 45° Gloss |
|---|---|---|---|---|---|---|---|
| none | — | 6000 | 2039 | 0.766 | 1.84 | N.A. | N.A. |
| diphenyl-acetic acid | 3.94 | 6000 | 2148 | 0.838 | 2.40 | N.A. | N.A. |
| 4-octyloxybenzoic acid | ~4.5 | 6000 | 2114 | 0.831 | 2.17 | N.A. | N.A. |
| myristic acid | ~4.9 | 6000 | 2134 | 0.829 | 2.26 | 100 | 162 |

For all the modifiers shown in Table 4, the dispersion migrated during orientation.

EXAMPLE 7

Preparation of Magnetic Recording Media

The procedure of Example 4 was followed, except additional surface treatment agents were tested. Also, Dowa HM-77 magnetic metal powder pigment was substituted for the Toda BR-I magnetic metal powder pigment. The results are shown in the following tables:

TABLE 5

Examples of Effective Surface Modification with Phosphonic Acid Modifiers
Dowa HM-77 pigment-0.015 moles Surface modifier per 100 g pigment

| Compound | Orientation Field (Oe) | Coercivity (Oe) | Squareness ($\phi r/\phi m$) | Gn (1/SFD) | 45° Gloss | Calendered 45° Gloss |
|---|---|---|---|---|---|---|
| 4-nitrobenzyl-phosphonic acid | 6000 | 2089 | 0.835 | 2.30 | 84 | 173 |
| 4-trifluoro-methylbenzyl- | 6000 | 2092 | 0.839 | 2.27 | 93 | 168 |

TABLE 5-continued

Examples of Effective Surface Modification with Phosphonic Acid Modifiers
Dowa HM-77 pigment-0.015 moles Surface modifier per 100 g pigment

| Compound | Orientation Field (Oe) | Coercivity (Oe) | Squareness ($\phi r/\phi m$) | Gn (1/SFD) | 45° Gloss | Calendered 45° Gloss |
|---|---|---|---|---|---|---|
| phosphonic acid | | | | | | |

TABLE 6

Comparative Examples of Modification with Phosphonic Acid Modifiers
Dowa HM-77 pigment-0.015 moles Surface modifier per 100 g pigment

| Compound | Orientation Field (Oe) | Coercivity (Oe) | Squareness ($\phi r/\phi m$) | Gn (1/SFD) | 45° Gloss | Calendered 45° Gloss |
|---|---|---|---|---|---|---|
| None | 6000 | 2039 | 0.766 | 1.84 | N.A. | N.A. |
| phenyl-phosphonic acid | 6000 | 2100 | 0.813 | 2.15 | N.A. | N.A. |
| t-butyl-benzyl-phosphonic acid | 6000 | 2144 | 0.871 | 2.34 | N.A. | N.A. |
| benzhydryl-phosphonic acid | 6000 | 2193 | 0.869 | 2.60 | N.A. | N.A. |

EXAMPLE 8

Preparation of Magnetic Recording Media

The procedure of Example 4 was followed, except additional surface treatment agents were tested. The results are shown in the following table. The results show that the level of surface treatment agent applied to the pigment drastically affected surface smoothness, and that the desirable level of use for glycolic acid is similar to 4-nitrobenzoic.

TABLE 7

Examples showing the importance of applying appropriate molar level of surface modifier.
Toda BR-I Pigment-Comparison of glycolic acid to 4-nitrobenzoic acid

| Compound | level (moles/100 g) | Orientation field (Oe) | Coercivity (Oe) | Squareness ($\phi r/\phi m$) | Gn (1/SFD) | 45° Gloss | Calendered 45° Gloss |
|---|---|---|---|---|---|---|---|
| none | 0 | 6000 | 1698 | 0.874 | 2.50 | N.A. | N.A. |
| glycolic acid | 0.006 | 6000 | 1698 | 0.884 | 2.45 | 99 | 159 |
| glycolic acid | 0.012 | 6000 | 1704 | 0.888 | 2.59 | 114 | 173 |
| glycolic acid | 0.018 | 6000 | 1704 | 0.879 | 2.33 | 101 | 170 |
| glycolic acid | 0.024 | 6000 | 1716 | 0.858 | 2.30 | 85 | 167 |
| 4-nitro-benzoic acid | 0.012 | 6000 | 1671 | 0.903 | 2.89 | 132 | 181 |
| 4-nitro-benzoic acid | 0.018 | 6000 | 1666 | 0.922 | 3.01 | 147 | 185 |
| 4-nitro-benzoic acid | 0.024 | 6000 | 1667 | 0.919 | 2.98 | 140 | 183 |

Although both glycolic acid and 4-nitrobenzoic acid work as surface modifiers, in that they improve gloss and magnetics, it is also evident that 4-nitrobenzoic acid works significantly better than glycolic acid.

EXAMPLE 9

Preparation of Magnetic Recording Media

The procedure of Example 4 was followed, except Toda B-III magnetic metal powder pigment was used in some of the samples instead of the Toda BR-I magnetic metal powder pigment. The results are shown in the following table. The results show that the best level of surface treatment for BR-1 pigment is different from the level most desirable for the B-III pigment. The results also show that there is a maximum amount of surface treatment agent that can be applied to a pigment beyond which the gloss and magnetic properties begin to suffer.

TABLE 8

Examples showing modifier level is pigment specific.
Toda Pigments-4-nitrobenzoic acid used as surface modifier.

| Pigment | level (moles/ 100 g) | Orientation field (Oe) | Coercivity (Oe) | Squareness ($\phi$r/$\phi$m) | Gn (1/SFD) | 45° Gloss | Calendered 45° Gloss |
|---|---|---|---|---|---|---|---|
| BR-I | 0 | 6000 | 1698 | 0.874 | 2.50 | N.A. | N.A. |
| BR-I | 0.012 | 6000 | 1671 | 0.903 | 2.89 | 132 | 181 |
| BR-I | 0.018 | 6000 | 1666 | 0.922 | 3.01 | 147 | 185 |
| BR-I | 0.024 | 6000 | 1667 | 0.919 | 2.98 | 140 | 183 |
| B-III | 0 | 6000 | 1743 | 0.910 | 2.53 | 92 | 137 |
| B-III | 0.006 | 6000 | 1741 | 0.926 | 2.63 | 69 | 152 |
| B-III | 0.012 | 6000 | 1741 | 0.898 | 2.62 | 67 | 145 |
| B-III | 0.018 | 6000 | 1746 | 0.921 | 2.59 | N.A. | N.A. |
| B-III | 0.024 | 6000 | 1739 | 0.909 | 2.63 | N.A. | N.A. |

EXAMPLE 10

Preparation of Magnetic Recording Media

The procedure of Example 4 was followed, except that Dowa HM-77 pigment was substituted for the Toda BR-I pigment. Additionally, this experiment was conducted with blends of 4-nitrobenzoic acid (which is a strong acid surface modifier with a strong electron-withdrawing group at the opposite end of the molecule from the absorbing group) and one of two modifiers which have a large steric hindrance: benzyhydrylphosphonic acid or 4'-octyloxy-4-biphenylcarboxylic acid. A blend of 4-nitrobenzoic acid and myristic acid was also tested as a comparative example for a molecule which would not be expected to increase the absorbed polymer layer thickness via the small steric hindrance of myristic acid The results are shown in the following tables.

In the first table, the blend of benzhydrylphosphonic acid and 4-nitrobenzoic acid as a surface treatment agent blend are compared to the use of either compound alone as a surface treatment agent The blend with 75% 4-nitrobenzoic acid and 25% benzhydrylphosphonic acid compares favorably to either pure surface modifier.

TABLE 9

Effects of Blending BHPA and 4-NBA
Dowa HM-77 pigment-0.015 moles Surface modifier per 100 g pigment

| Compound | Orientation Field (Oe) | Coercivity (Oe) | Squareness ($\phi$r/$\phi$m) | Gn (1/SFD) | 45° Gloss | Calendered 45° Gloss |
|---|---|---|---|---|---|---|
| 100% 4-nitrobenzoic acid | 6000 | 2160 | 0.848 | 2.26 | 134 | 177 |
| 100% benzhydrylphosphonic acid | 6000 | 2193 | 0.869 | 2.60 | N.A. | N.A. |
| 75% 4-nitrobenzoic acid; 25% benzhydrylphosphonic acid | 6000 | 2189 | 0.861 | 2.37 | 130 | 178 |
| 100% 4-nitrobenzoic acid | 1600 | 1852 | 0.636 | 1.25 | 119 | 170 |
| 100% benzhydrylphosphonic acid | 1600 | 2030 | 0.713 | 1.73 | 115 | 168 |
| 75% 4-nitrobenzoic acid; 25% benzhydrylphosphonic acid | 1600 | 1876 | 0.641 | 1.32 | 122 | 174 |

Note in Table 9 that the benzhydrylphosphonic acid does an excellent job at low field orientation. However, when oriented at high magnetic fields necessary to achieve good orientation in magnetic tape, the dispersion migrates severely such that a continuous coating was not obtained. The sample which used the blend provided slightly higher coercivity and squareness than pure nitrobenzoic acid.

In Table 10, a blend of 4'-octyloxy-4-biphenylcarboxylic acid and 4-nitrobenzoic acid as a surface treatment agent blend are compared using either compound alone as a surface treatment agent The blend with 75% 4-nitrobenzoic acid and 25% 4'-octyloxy-4-biphenylcarboxylic acid compares favorably to either pure surface modifier.

TABLE 10

Effects of Blending 4'-octyloxy-4-biphenylcarboxylic acid and 4-NBA
HM-77 pigment-0.015 moles Surface modifier per 100 g pigment

| Compound | Orientation Field (Oe) | Coercivity (Oe) | Squareness ($\phi r/\phi m$) | Gn (1/SFD) | 45° Gloss | Calendered 45° Gloss |
|---|---|---|---|---|---|---|
| 100% 4-nitrobenzoic acid | 3000 | 2132 | 0.812 | 2.22 | 135 | 180 |
| 100% 4'-octyloxy-4-biphenyl-carboxylic acid | 3000 | 2115 | 0.810 | 2.08 | N.A. | N.A. |
| 75% 4-nitrobenzoic acid; 25% 4'-octyloxy-4-biphenyl-carboxylic acid | 3000 | 2149 | 0.814 | 2.19 | 132 | 183 |
| 100% 4-nitrobenzoic acid | 1600 | 1858 | 0.635 | 1.29 | 138 | 178 |
| 100% 4'-octyloxy-4-biphenyl-carboxylic acid | 1600 | 1764 | 0.580 | 1.03 | 17 | 142 |
| 75% 4-nitrobenzoic acid; 25% 4'-octyloxy-4-biphenyl-carboxylic acid | 1600 | 1883 | 0.642 | 1.34 | 128 | 176 |

Again, the sample which used a mixture of surface treatment agents provide slightly higher coercivity and squareness, while maintaining good smoothness when oriented at high magnetic fields.

In Table 11, a blend myristic acid and 4-nitrobenzoic acid as a surface treatment agent blend is compared to using either compound alone as a surface treatment agent. The blend with 75% 4-nitrobenzoic acid and 25% myristic acid compares unfavorably to the 100% 4-nitrobenzoic acid data and compares unfavorably to the benzhydryl phosphonic acid or 4'-octyloxy-4-biphenylcarboxylic acid from tables 9 and 10. This is expected since the flexibility of the myristic acid molecule does not impart steric hindrance higher than that of the 4-nitrobenzoic acid itself.

TABLE 11

Effects of Blending myristic acid and 4-NBA
HM-77 pigment-0.015 moles Surface modifier per 100 g pigment

| Compound | Orientation Field (Oe) | Coercivity (Oe) | Squareness ($\phi r/\phi m$) | Gn (1/SFD) | 45° Gloss | Calendered 45° Gloss |
|---|---|---|---|---|---|---|
| 100% 4-nitrobenzoic acid | 6000 | 2160 | 0.848 | 2.26 | 134 | 177 |
| 100% myristic acid | 6000 | 2134 | 0.829 | 2.26 | N.A. | N.A. |
| 75% 4-nitrobenzoic acid 25% myristic acid | 6000 | 2123 | 0.813 | 2.20 | 92 | 165 |
| 100% 4-nitrobenzoic acid | 1600 | 1852 | 0.636 | 1.25 | 119 | 170 |
| 100% % myristic acid | 1600 | 1814 | 0.616 | 1.21 | 103 | 169 |
| 75% 4-nitrobenzoic acid; 25% % myristic acid | 1600 | 1839 | 0.624 | 1.24 | 113 | 172 |

EXAMPLE 11

Preparation of Magnetic Recording Media

Using different surface treatment agents, a number of magnetic recording media samples were prepared using the following formulation:

| | |
|---|---|
| Metal particle magnetic pigment (Dowa HM-101) | 100 parts by weight |
| Vinyl copolymer of example 1 | * See below |
| Polyurethane of example 3 | ** See below |
| Surface treatment agent | 0.018 mol/100 g pigment |
| myristic acid (10.7% solids in MEK) | 2 parts by weight of solids |
| butyl stearate | 1 part by weight |
| TPA of example 3A (50% by weight TPA in MEK) | 4.0 activation index |

* For each sample, the amount of vinyl copolymer to add was determined from the following formula:
weight = 0.5 [20.46 − weight surface − weight
polymer              treatment agent    crosslinker]
** For each sample, the amount of polyurethane to add was determined from the following formula:
weight = 0.5 [20.46 − weight surface − weight
polymer              treatment agent    crosslinker]

To prepare each sample, an admixture of the surface treatment agent and the pigment in THF was made such that the total weight percent solids was 80%. The admixture was aggressively mixed in the $N_2$-blanketed kneading chamber of the Brabender kneader. After surface treatment was complete, a polymer solution containing one half of each polymer was added to the kneaded ingredients in the kneader as a polymer solution of 40% by weight solids in a 100% MEK. Kneading was continued until a smooth paste was obtained. As described in Example 4, torque was monitored and mixing continued for 5 minutes after the torque spike occurred.

After kneading was completed, the kneaded paste was further processed in a Quickee mill, where the other half of the polymers were added, again as a polymer solution at 40% solids in 100% MEK. An amount of a 40:30:30 blend of MEK/THF/MIBK was added to adjust the solids content to 50%. The lubricants, activator, and sufficient 40:30:30 blend of MEK/THF/MIBK to provide a 32% solids content were then blended into the other ingredients using a shaker. The final weight loading of magnetic pigment in the resultant dispersion relative to the other non-solvent ingredients was 81% by weight in all samples. Handspreads of each dispersion sample were pulled at 32% final solids in order to coat the dispersion onto a substrate. Handspreads were pulled with different orientation fields. For some samples, one procedure was used in which the handspreads were pulled through a 1600 Oe permanent magnetic field. For other samples, handspreads were pulled first and then dried in a 6000 Oe electromagnetic field. A sample of each handspread was also calendered.

Samples were made using blends incorporating 4-nitrobenzoic acid, which has a strong acidic group and a strong electron-withdrawing group at the opposite end of the molecule, as one surface treatment agent. This was blended with one of two surface treatment agents which have the capability of cross-linking into the binder matrix. These other agents were 4-aminobenzoic acid and sulfanilic acid. Both have an amine group at the opposite end of the molecule from the acidic group. The amine group is capable of cross-linking with the isocyanate activator. The properties of the resultant handspreads are shown in the following tables:

TABLE 12

Effects of Blending 4-ABA and 4-NBA
Dowa HM-101 pigment-0.018 moles Surface modifier per 100 g pigment

| Compound | Orientation Field (Oe) | Coercivity (Oe) | Squareness ($\phi r/\phi m$) | Gn (1/SFD) | 45° Gloss | Calendered 45° Gloss |
|---|---|---|---|---|---|---|
| 100% 4-nitro-benzoic acid | 6000 | 1784 | 0.810 | 1.80 | 33 | 143 |
| 100% 4-amino-benzoic acid | 6000 | 1703 | 0.738 | 1.32 | N.A. | N.A. |
| 67% 4-nitro-benzoic acid; 33% 4-amino-benzoic acid | 6000 | 1799 | 0.805 | 1.75 | 30 | 137 |
| 100% 4-nitro-benzoic acid | 1600 | 1622 | 0.652 | 1.16 | 42 | 159 |
| 100% 4-amino-benzoic acid | 1600 | 1579 | 0.625 | 0.96 | 17 | 131 |
| 67% 4-nitro-benzoic acid 33% 4-amino-benzoic acid | 1600 | 1638 | 0.656 | 1.16 | 46 | 147 |

TABLE 13

Effects of Blending sulfanilic acid and 4-NBA
HM-101 pigment-0.018 moles Surface modifier per 100 g pigment

| Compound | Orientation Field (Oe) | Coercivity (Oe) | Squareness ($\phi r/\phi m$) | Gn (1/SFD) | 45° Gloss | Calendered 45° Gloss |
|---|---|---|---|---|---|---|
| 100% 4-nitro-benzoic acid | 6000 | 1784 | 0.810 | 1.80 | 33 | 143 |
| 100% | 6000 | 1678 | 0.695 | 1.18 | N.A. | N.A. |

TABLE 13-continued

Effects of Blending sulfanilic acid and 4-NBA
HM-101 pigment-0.018 moles Surface modifier per 100 g pigment

| Compound | Orientation Field (Oe) | Coercivity (Oe) | Squareness ($\phi r/\phi m$) | Gn (1/SFD) | 45° Gloss | Calendered 45° Gloss |
|---|---|---|---|---|---|---|
| sulfanilic acid 67% 4-nitro-benzoic acid; 33% sulfanilic acid | 6000 | 1772 | 0.806 | 1.69 | 25 | 146 |
| 100% 4-nitro-benzoic acid | 1600 | 1622 | 0.652 | 1.16 | 42 | 159 |
| 100% sulfanilic acid | 1600 | 1567 | 0.598 | 0.93 | 3 | 115 |
| 67% 4-nitro-benzoic acid; 33% sulfanilic acid | 1600 | 1613 | 0.640 | 1.12 | 32 | 153 |

Note in Table 12 that the 4-ABA performs poorly by itself as a surface treatment agent and does not prevent orientation roughening and dispersion migration. However, the blend of 4-ABA and 4-NBA performs well, with a higher coercivity than the pure 4-NBA and magnetic properties and gloss only slightly inferior to the sample with pure 4-NBA as a surface modifier.

In Table 13, for the sample using pure sulfanilic acid, the magnetic properties were poor and the sample had severe orientation roughening. In contrast, the blend provided magnetic properties almost as good as the sample with pure 4-NBA, while also maintaining good smoothness when oriented at high magnetic fields.

EXAMPLE 12
Preparation of Magnetic Recording Media

The procedure of Example 11 was followed, except a blend of 4-NBA and benzhydrylphosphonic acid (BHPA) were used as the surface treatment agents. Also, the amount of binder was increased slightly so that the final weight loading of magnetic pigment in the dried coating was 82%. The binder still included 50% by weight of the vinyl copolymer and 50% by weight of the polyurethane. The results are shown in the following table:

TABLE 14

Effects of Blending BHPA acid and 4-NBA
HM-101 pigment-0.018 moles Surface modifier per 100 g pigment

| Compound | Orientation Field (Oe) | Coercivity (Oe) | Squareness ($\phi r/\phi m$) | Gn (1/SFD) | 45° Gloss | Calendered 45° Gloss |
|---|---|---|---|---|---|---|
| 100% 4-nitro-benzoic acid | 6000 | 1792 | 0.797 | 1.71 | 26 | 154 |
| 95% 4-nitro-benzoic acid 5% benzhydryl-phosphonic acid | 6000 | 1783 | 0.786 | 1.65 | 26 | 146 |
| 90% 4-nitro-benzoic acid 10% benzhydryl-phosphonic acid | 6000 | 1797 | 0.806 | 1.72 | 38 | 155 |
| 75% 4-nitro-benzoic acid; 25% benzhydryl-phosphonic acid | 6000 | 1822 | 0.833 | 1.83 | 51 | 162 |
| 50% 4-nitro-benzoic acid; 50% benzhydryl-phosphonic acid | 6000 | 1823 | 0.834 | 1.88 | 49 | 145 |
| 25% 4-nitro-benzoic acid 75% benzhydryl-phosphonic acid | 6000 | 1812 | 0.831 | 1.82 | 33 | 145 |
| 100% benzhydryl-phosphonic acid | 6000 | 1790 | 0.821 | 1.73 | 18 | 148 |

The data in Table 14 shows that there is a synergistic effect in blending the two surface modifiers. The blends between 10% and 50% benzhydrylphosphonic mixed with the remainder of 4-NBA show improved squareness, coercivity, goodness, and gloss compared to either pure 4-NBA or compared to pure benzhydrylphosphonic acid. The blend outperformed either pure compound as a surface treatment agent.

It should be noted that, although the sample with pure benzhydrylphosphonic acid did not migrate so severely such that gloss could not be measured, it did show significant orientation roughness as reflected in the uncalendered gloss reading of 18.

EXAMPLE 13

Preparation of Magnetic Recording Media

The mixing chamber of a Brabender Plasticorder kneader (C. W. Brabender Instruments, Inc., 50 East Wesley Street, South Hackensack, N.J. 07606 USA) was enclosed in a glove bag and purged with nitrogen gas for five minutes. 50 g of magnetic pigment (Dowa HM-77) was placed in the kneader along with a previously mixed solution of 1.25 g 4-nitrobenzoic acid (Aldrich Chemical Co., 1001 West Saint Paul Avenue, Milwaukee, Wis. 53233 USA) in 12.81 g Tetrahydrofuran (THF) solvent. After addition of the surface treatment solution, the ingredients were kneaded for 10 minutes at 120 rpm. The torque was monitored. After 10 minutes, 9.29 g of a polymer solution was added to the kneader. The polymer solution included a 60:40 by weight blend of the polyurethane of Example 2 and the vinyl copolymer of Example 1 at 28% solids in a solvent blend of MEK, THF, and MIBK at a weight ratio of 40:30:30, respectively. The torque was monitored until a spike in the measured torque was observed. After reaching the torque spike, visual inspection showed that the contents of the kneader had been transformed into a smooth paste. The kneader was allowed to mix the paste for 5 additional minutes. After 5 minutes, the kneader was stopped and the contents were removed.

A portion of the kneaded paste was transferred from the kneader into the 5.5 fluid oz. mill jar of a Quickee Ball Mill (BYK Gardner, Inc., 2435 Linden Lane, Silver Spring, Md., 20910 USA). The mill jar included 200g of stainless steel balls (⅛ inch). Enough paste was added to the mill so that there was 16 g of pigment in the mill jar. In addition to the kneaded paste, 2.98 g of polymer solution was also added to the Quickee mill (60:40 weight ratio of polyurethane of Example 2 and non-halogenated vinyl copolymer of Example I at 28% solids in a 40:30:30 solution of MEK:THF:MIBK). An additional amount of the 40:30:30 MEK:THF:MIBK solvent blend was added so that the total solids weight percent in the mill jar was 50%. The ingredients were milled by shaking on a red devil paint conditioner (BYK-Gardner) for 90 minutes. After shaking, the lubricants and activator were blended into the admixture in the mill jar and then shaken some more. Myristic acid was added as a solution in MEK (10.7% by weight) and butyl stearate was added neat. 0.32 g myristic acid solids were added and 0.16 g butyl stearate was added. In addition, 0.50 g activator (55% by weight solids Mondur CB55N in MEK) were also added. Then additional solvent (40:30:30 blend of MEK:THF:MIBK) was added to bring the total solids to 30% by weight. Then the mill jar was shaken another 30 minutes.

After this final shaking, ICI viscosity was measured and a magnetically oriented handspread knife-coating was made for each dispersion. There were two handspreads prepared, one oriented by pulling through abset of opposed permanent magnets with a field strength of 1600 Oe. The other handspread was oriented by drying in a 15 inch long solenoid with enough current to create a uniform field of 6000 Oe.

The gloss was measured with a 45° Glossmeter and magnetic properties were measured on a 3000 Oe M-H meter. Samples were calendered with a single nip calendar roll at 750 pli for gloss measurements and 3000 pli for magnetic property measurements. The results were as follows:

Coercivity=2101 Oe, Squareness ratio=0.905, Gn=2.65 (SFD=0.377).

45° Gloss=188.

An identical repeat of example 13 was made and the following magnetic properties were measured:

Coercivity=2083 Oe, Squareness ratio=0.872, Gn=2.36 (SFD=0.424).

45° Gloss=177.

EXAMPLE 14

Preparation of Magnetic Recording Media

The mixing chamber of the Brabender plasticorder (kneader) was enclosed in a glove bag and purged with nitrogen gas for five minutes. 50 g of magnetic pigment (Dowa HM-77) was placed in the kneader and a previously mixed solution of 0.94 g 4-nitrobenzoic acid (4-NBA) and 0.47 g benzhydrylphosphonic acid (Imation Harlow) in 12.85 g Tetrahydrofuran solvent was added. It should be noted that the benzhydrylphosphonic acid was not soluble in THF and thus a slurry was added to the kneader. The jar containing the mixture of 4-NBA, benzhydrylphosphonic acid (BHPA) and THF was then rinsed with an additional approximate 3 ml of THF and the rinse was also added to the kneader.

After addition of the surface treatment agent solution, the solution was mixed with the pigment in the kneader for 10 minutes at 120 rpm. The torque was monitored. After 10 minutes, 9.06 g of a polymer solution was added to the kneader. The polymer solution was a 60:40 blend by weight of polyurethane of Example 2 and the non-halogenated vinyl resin of Example 1 at 28% solids in a 40:30:30 by weight blend of MEK:THF:MIBK. The torque was monitored until a spike in the measured torque was observed. After reaching a torque spike, the contents of the kneader had been transformed into a paste. After reaching the torque spike, the kneader was allowed to mix the paste for 5 additional minutes. After 5 minutes, the kneader was stopped and the contents were removed.

The weight percent solids were measured for the paste. The paste was then added into a 5.5 fluid ounce mill jar of a Quickee Ball Mill with 200g stainless steel balls (⅛ inch). Enough paste was added so that there was 16 g of pigment in the mill jar. In addition to the kneaded paste, 2.90 g of a polymer solution was added to the Quickee mill (60:40 by weight blend of polyurethane and non-halogenated vinyl hard resin at 28% solids in a 40:30:30 solution of MEK:THF:MIBK as above in this Example). In addition, a solution of 40:30:30 MEK:THF:MIBK was added so that the total solids weight percent in the mill jar was 50%. This admixture was then shaken on a red devil paint conditioner (BYK-Gardner) for 90 minutes. After shaking, the lubricants and crosslinker were added. The myristic acid was added as a solution at 0.32 g myristic acid in MEK (10.7% by weight) and 0.16 g butyl stearate was added neat. In addition, the 0.49 g crosslinker solution was added (55% by weight solids Mondur CB55N in MEK). Then additional solvent (40:30:30 mixture of MEK:THF:MIBK) was added to bring the total solids to 30%. Then the mill jar was shaken another 30 minutes before evaluation.

After this final shaking, ICI viscosity was measured and a magnetically oriented handspread knife-coating were made for each dispersion as in example 13. The results were as follows:

Coercivity=2112 Oe, Squareness ratio=0.895, Gn=2.48 (SFD=0.403).

45° Gloss=178.

These magnetic properties compare favorably to the magnetic properties of a sample made with pure 4-nitrobenzoic acid used as a surface modifier prepared at the same time (the repeat of example 13). There is little to no orientation roughness as indicated by the excellent gloss and the coercivity is improved over pure 4-nitrobenzoic acid indicating a larger separation between magnetic particles was achieved at the same weight percent magnetic pigment loading.

EXAMPLE 15

Preparation of Magnetic Recording Media

After purging the mixing chamber of the Brabender kneader with nitrogen gas for five minutes, 48 g of magnetic pigment (Dowa HM-101) was placed in the kneader and a previously mixed solution of 0.96 g 4-nitrobenzoic acid in 7.5 g Tetrahydrofuran solvent was added to the kneader. After addition of the surface treatment agent solution, the ingredients were mixed in the kneader for 7 minutes at 120 rpm. The torque was monitored. After 7 minutes, a previously mixed solution of 0.39 g of 4-aminobenzoic acid in 7.1 g THF was added to the mixing chamber. After 7 additional minutes of mixing, a polymer solution was added to the kneader. The polymer solution was a 50:50 blend of the polyurethane of Example 3 and the non-halogenated vinyl resin of Example 1 at 40% solids in MEK solvent. 6.77 g of polymer solution was added to the kneader. The torque was monitored until a spike in the measured torque was observed. After reaching the torque spike, the contents of the kneader had been transformed into a paste. After reaching the torque spike, the kneader was allowed to mix the paste for 5 additional minutes. After 5 minutes, the kneader was stopped and the contents were removed.

The weight percent solids were measured for the paste, and then the paste was added into the Quickee Ball Mill so that there was 16 g of pigment in the mill jar. In addition to the kneaded paste, a polymer solution was added to the Quickee mill (50:50 by weight polyurethane of Example 3 and non-halogenated vinyl hard resin of Example 1 at 40% solids in MEK). The amount of polymer solution added was 2.17 g. In addition, a solution of 40:30:30 MEK:THF:MIBK was added so that the total solids weight percent in the mill jar was 50%. This was then shaken on a paint conditioner for 90 minutes. After shaking, the lubricants were added. Myristic acid was added as a solution in MEK (10.7% by weight) and butyl stearate was added neat. 0.32 g myristic acid solids were added and 0.16 g butyl stearate was added. Then additional solvent (40:30:30 mixture of MEK:THF:MIBK) was added to bring the total solids to 32%. Then the mill jar was shaken another 30 minutes before evaluation. After 30 minutes, the crosslinker was added. The crosslinker used was the TPA of Example 3A at 50% solids in MEK. 1.99 g of the TPA solution was added to the mill.

After this final shaking, ICI viscosity was measured and a magnetically oriented handspread knife-coating were made for each dispersion as described for example 13. The results were as follows:

Coercivity=1726 Oe, Squareness ratio=0.822, Gn=1.81 (SFD=0.552).

45° Gloss=137.

Although these values are lower than the values for dispersing HM-77 in the phosphonated polyurethane as in Examples 13 and 14, the Gloss and other properties are excellent for this pigment with these binders. There was only slight orientation roughness with this sample.

EXAMPLE 16

Preparation of Magnetic Recording Media

After purging the mixing chamber of the Brabender kneader with nitrogen gas for five minutes, 47 g of magnetic pigment (Dowa HM-101) was placed in the kneader, and then 1.05 g of dry benzhydrylphosphonic acid ("BHPA") was added to the kneader followed by the addition of a previously mixed solution of 0.71 g 4-nitrobenzoic acid in 7.1 g Tetrahydrofuran (THF) solvent. An additional 3.8 g THF solvent was used to rinse the jar from which the BHPA had been added and the rinse was also added to the kneader. After addition of the surface treatment solution, the ingredients were mixed with the pigment in the kneader for 10 minutes at 120 rpm. The torque was monitored. After 10 minutes of mixing, a polymer solution was added to the kneader. The polymer was the non-halogenated vinyl resin of Example 1 at 41% solids in MEK solvent. 5.63 g of polymer solution was added to the kneader. After 6 minutes a torque spike appeared. After reaching a torque spike, the contents of the kneader had been transformed into a paste. After reaching the torque spike, the kneader was allowed to mix the paste for 5 additional minutes. After 5 minutes, the kneader was stopped and the contents were removed.

The weight percent solids were measured on the paste, and then the paste was added into the Quickee Ball Mill so that there was 16 g of pigment in the mill jar. In addition to the kneaded paste, the carboxylated polyurethane of Example 3 at 40% solids in MEK was added. The amount of polyurethane polymer solution added was 1.96 g. In addition, a solution of 40:30:30 MEK:THF:MIBK was added so that the total solids weight percent in the mill jar was 50%. This was then shaken on a paint conditioner for 90 minutes. After shaking, the lubricants were added. Myristic acid was added as a solution in MEK (10.7% by weight) and butyl stearate was added neat. 0.32 g myristic acid solids were added and 0.16 g butyl stearate was added. Then additional solvent (40:30:30 mixture of MEK:THF:MIBK) was added to bring the total solids to 32%. Then the mill jar was shaken another 30 minutes before evaluation. After 30 minutes, the crosslinker was added. The crosslinker used was the TPA of Example 3A in a 50% by weight solids solution in MEK. 1.75 g of the TPA solution was added to the mill.

After this final shaking, ICI viscosity was measured and a magnetically oriented handspreadknife-coating were made for each dispersion as described for example 13. The results were as follows:

Coercivity=1722 Oe, Squareness ratio=0.841, Gn=1.96 (SFD=0.510).

45° Gloss=145.

Although these values are lower than the values for dispersing HM-77 in the phosphonated polyurethane as in Examples 13 and 14, the Gloss and other properties are excellent for this pigment with these binders. There was little or no orientation roughness with this sample.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A magnetic recording medium comprising a substrate and an information storing layer provided on the substrate, said information storing layer comprising:

(a) a polymeric binder containing no covalently bound halogen atoms comprising a nonhalogenated vinyl copolymer having quaternary ammonium functionality; and (b) a plurality of surface treated magnetic pigment particles dispersed in said polymeric binder; said surface treated magnetic pigment particles having been surface treated before mixing with said polymeric binder by at least a first surface treatment agent which is adsorbed onto the surface of at least a portion of magnetic pigment particles, wherein said first surface treatment agent comprises at least one pendant acidic group and at least one pendant electron withdrawing group.

2. The magnetic recording medium of claim 1, wherein the magnetic pigment is a magnetic metal powder.

3. The magnetic recording medium of claim 1, wherein the polymeric binder further comprises a polyurethane polymer.

4. The magnetic recording medium of claim 3, wherein the polyurethane polymer comprises —COOM functionality, wherein M is hydrogen or a monovalent cation.

5. The magnetic recording medium of claim 3, wherein the polyurethane polymer comprises phosphonic acid, phosphonate functionality, or combinations thereof.

6. The magnetic recording medium of claim 1, wherein the electron withdrawing group is selected from nitro, chloro, bromo, fluoro, iodo, oxo, perfluoroalkyl, perfluoroalkoxy, hydroxy, cyano, and combinations of these.

7. The magnetic recording medium of claim 1, wherein the acidic group is selected from the group consisting of an anhydric group, —COOH, a sulfonic acid group, a phosphonic acidic group, salts thereof, and combinations of these.

8. The magnetic recording medium of claim 1, wherein the first surface treatment agent has the formula

wherein E is the electron withdrawing group, A is the acidic group, and X comprises an aromatic moiety.

9. The magnetic recording medium of claim 8, wherein X is an aromatic ring, and E and A are ring substituents of the aromatic ring attached to carbon atoms within the aromatic ring separated from each other by at least one carbon atom within the aromatic ring.

10. The magnetic recording medium of claim 8, wherein E and A are attached to carbon atoms within the aromatic ring separated from each other by at least two carbon atoms within the aromatic ring.

11. The magnetic recording medium of claim 1, wherein the surface treatment agent has a pKa of up to about 4.5.

12. The magnetic recording medium of claim 1, wherein the first surface treatment agent has the formula

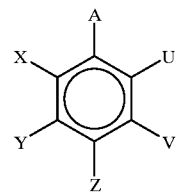

wherein A is the acidic group; at least one of Y, Z, and V is a substituent comprising an electron withdrawing group, and each of the ring substituents other than A and said at least one electron withdrawing group is a monovalent group or together with another of the substituents, is a co-member of a ring structure.

13. The magnetic recording medium of claim 1, wherein the first surface treatment agent has the formula

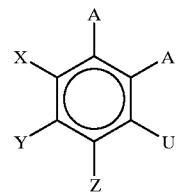

wherein A is the acidic group; at least one of Y, Z, and V is a substituent comprising an electron withdrawing group, and each of the ring substituents other than A and said at least one electron withdrawing group is a monovalent group or together with another of the substituents, is a co-member of a ring structure.

14. The magnetic recording medium of claim 1, wherein the first surface treatment agent has the formula wherein at least one of Y and Z is a substituent comprising an electron withdrawing group, and each of the remaining ring substituents other than said at least one electron withdrawing group is a monovalent group or together with another of the substituents, is a co-member of a ring structure.

15. The magnetic recording medium of claim 1, wherein the first surface treatment agent has the formula wherein each A independently is the acidic group; at least one of Y, Z, Z', and Y' is a substituent comprising an electron withdrawing group, and each of the remaining ring substituents other than A and said at least one electron withdrawing group is a monovalent group or, together with another of the substituents, is a co-member of a ring structure.

16. The magnetic recording medium of claim 1, wherein the first surface treatment agent has the formula

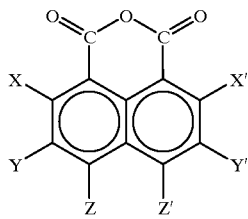

wherein at least one of Y, Z, Z', and Y' is a substituent comprising an electron withdrawing group, and each of the remaining X, Y, Z, X', Y', and Z' ring substituents other than said at least one electron withdrawing group is a monovalent group or together with another of the substituents, is a co-member of a ring structure.

17. The magnetic recording medium of claim 1, wherein the first surface treatment agent has the formula

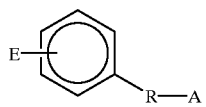

wherein E is the electron-withdrawing group and is at a meta or para position relative to the -R-A substituent; A is the acidic group; and R is a divalent linking group of 1 to 4 carbon atoms.

18. The magnetic recording medium of claim 1, wherein the first surface treatment agent has the formula

E-Y-A wherein E is the electron withdrawing group, A is the acidic group, and Y is a divalent moiety comprising a nonaromatic backbone.

19. The magnetic recording medium of claim 18, wherein E and A are each pendant from substantially opposite ends of said backbone.

20. The magnetic recording medium of claim 1, wherein the information storing layer further comprises a second surface treatment agent, wherein said second surface treatment agent comprises at least one acidic group.

21. The magnetic recording medium of claim 20, wherein said second surface treatment agent has a molecular weight at least as large as that of the first surface treatment agent.

22. The magnetic recording medium of claim 20, wherein the second surface treatment agent further comprises at least one pendant moiety capable of covalently bonding with the polymeric binder.

23. The magnetic recording medium of claim 22, wherein said crosslinkable moiety is selected from a carbon—carbon double bond, OH, SH, amine, and combinations thereof.

24. The magnetic recording medium of claim 20, wherein the acidic group of the second surface treatment agent has a pKa up to at least about 4.5.

25. The magnetic recording medium of claim 20, wherein the acidic group of the second surface treatment agent is selected from an anhydric group, —COOH, a sulfonic acidic group, a phosphonic acidic group, salts thereof, and combinations of these.

26. The magnetic recording medium of claim 20, wherein the second the second surface treatment agent comprises a plurality of aromatic ring moieties.

27. The magnetic recording medium of claim 2, wherein the acidic group of said second surface treatment agent has a pKa lower than the pKa of any acidic dispersing group of the polymeric binder.

28. The magnetic recording medium of claim 20, wherein each of the acidic groups of said first and second surface treatment agents has a pKa lower than the pKa of any acidic dispersing group of the polymeric binder.

29. A surface treated magnetic pigment, comprising:
  (a) a first surface treatment agent adsorbed onto the surface of the magnetic pigment, said first surface treatment agent comprising at least one pendant acidic group and at least one pendant electron withdrawing group; and
  (b) a second surface treatment agent adsorbed onto the surface of the magnetic pigment, said second surface treatment agent different from the first surface treatment agent and comprising at least one pendant acidic group and at least one pendant group selected from the group consisting of OH, NH$_2$, SH and a group containing an unsaturated carbon—carbon bond.

30. The surface treated magnetic pigment of claim 29, wherein the magnetic pigment is a magnetic metal powder.

31. The surface treated magnetic pigment of claim 29, wherein the electron withdrawing group is selected from nitro, chloro, bromo, iodo, fluoro, oxo, perfluoroalkyl, perfluoroalkoxy, hydroxy, cyano, and combinations of these.

32. The surface treated magnetic pigment of claim 29, wherein the acidic group of each of the first and second surface treatment agents is independently selected from the group consisting of an anhydric group, —COOH, a sulfonic acidic group, a phosphonic acidic group, salts thereof, and combinations of these.

33. The surface treated magnetic pigment of claim 29, wherein the first surface treatment agent has the formula

E-X-A wherein E is the electron withdrawing group, A is the acidic group, and X comprises an aromatic moiety.

34. The surface treated magnetic pigment of claim 33, wherein X is an aromatic ring, and E and A are ring substituents of the aromatic ring attached to carbon atoms within the aromatic ring separated from each other by at least one carbon atom within the aromatic ring.

35. The surface treated magnetic pigment of claim 33, wherein E and A are attached to carbon atoms within the aromatic ring separated from each other by at least two carbon atoms within the aromatic ring.

36. The surface treated magnetic pigment of claim 33, wherein the acidic group of each of the first and second surface treatment agents has a pKa of up to about 4.5.

37. The magnetic recording medium of claim 29, wherein the first surface treatment agent has the formula

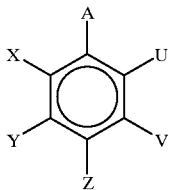

wherein A is the acidic group; at least one of Y, Z, and V is a substituent comprising an electron withdrawing group, and each of the ring substituents other than A and said at least one electron withdrawing group is a monovalent group or together with another of the substituents, is a co-member of a ring structure.

38. The magnetic recording medium of claim 29, wherein the first surface treatment agent has the formula

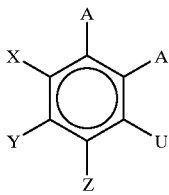

wherein A is the acidic group; at least one of Y, Z, and V is a substituent comprising an electron withdrawing group, and each of the ring substituents other than A and said at least one electron withdrawing group is a monovalent group or together with another of the substituents, is a co-member of a ring structure.

39. The magnetic recording medium of claim 29, wherein the first surface treatment agent has the formula

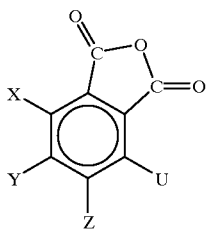

wherein at least one of Y and Z is a substituent comprising an electron withdrawing group, and each of the remaining X, Y, Z, and U ring substituents other than said at least one electron withdrawing group is a monovalent group or together with another of the substituents, is a co-member of a ring structure.

40. The magnetic recording medium of claim 29, wherein the first surface treatment agent has the formula

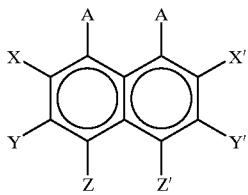

wherein each A independently is the acidic group; at least one of Y, Z, Z', and Y' is a substituent comprising an electron withdrawing group, and each of the remaining ring substituents other than A and said at least one electron withdrawing group is a monovalent group or, together with another of the substituents, is a co-member of a ring structure.

41. The magnetic recording medium of claim 29, wherein the first surface treatment agent has the formula

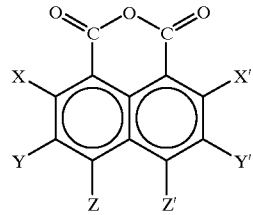

wherein at least one of Y, Z, Z', and Y' is a substituent comprising an electron withdrawing group, and each of the remaining X Y, Z, X', Y', and Z' ring substituents other than said at least one electron withdrawing group is a monovalent group or together with another of the substituents, is a co-member of a ring structure.

42. The magnetic recording medium of claim 29, wherein the first surface treatment agent has the formula

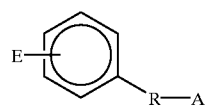

wherein E is the electron-withdrawing group and is at a meta or para position relative to the -R-A substituent; A is the acidic group; and R is a divalent linking group of 1 to 4 carbon atoms.

43. The surface treated magnetic pigment of claim 29, wherein the first surface treatment agent has the formula

E-Y-A wherein E is the electron withdrawing group, A is the acidic group, and Y is a divalent moiety comprising a nonaromatic backbone.

44. The surface treated magnetic pigment of claim 43, wherein E and A are each pendant substantially from opposite ends of said backbone.

45. The surface treated magnetic pigment of claim 29, wherein the second surface treatment agent has a molecular weight at least as large as that of the first surface treatment agent.

46. The surface treated magnetic pigment of claim 29, wherein the second surface treatment agent comprises a plurality of aromatic ring moieties.

47. The surface treated magnetic pigment of claim 29, wherein the acidic group of the second surface treatment agent is selected from an anhydric group, —COOH, a sulfonic acid group, a phosphonic acidic group, salts thereof, and combinations of these.

48. The surface treated magnetic pigment of claim 29, wherein the electron withdrawing group is selected from nitro, chloro, bromo, iodo, fluoro, oxo, perfluoroalkyl, perfluoroalkoxy, hydroxy, cyano, and combinations of these.

49. A magnetic recording medium comprising a substrate and an information storing layer provided on the substrate, said information storing layer comprising:

(a) a polymeric binder comprising a nonhalogenated vinyl copolymer having quaternary ammonium functionality;
(b) a plurality of magnetic pigment particles dispersed in the polymeric binder; and
(c) a first surface treatment agent adsorbed onto the surface of at least a portion of the magnetic pigment particles, wherein the surface treatment agent comprises at least one pendant acidic group and at least one pendant electron withdrawing group, and a second surface treatment agent, wherein said second surface treatment agent has a molecular weight at least as large as that of the first surface treatment agent and comprises at least one acidic group and at least one pendant moiety capable of covalently bonding with the polymeric binder, wherein the at least one pendant moiety is selected from a carbon—carbon double bond, OH, SH, amine, and combinations thereof.

* * * * *

UNITED STATES PATENT AND TRADEMARK OFFICE
CERTIFICATE OF CORRECTION

PATENT NO. : 6,139,946
DATED : October 31, 2000
INVENTOR(S) : Bailey et al.

It is certified that error appears in the above-identified patent and that said Letters Patent is hereby corrected as shown below:

Column 47,
Line 60, "said crosslinkable moiety" should be -- said moiety --.

Column 48,
Line 7, "claim 2" should be -- claim 20 --.

Signed and Sealed this

Thirtieth Day of October, 2001

*Attest:*

Nicholas P. Godici

NICHOLAS P. GODICI
*Attesting Officer*   Acting Director of the United States Patent and Trademark Office